US012789615B2

(12) United States Patent
Olason

(10) Patent No.: US 12,789,615 B2
(45) Date of Patent: Nov. 10, 2026

(54) ELECTRICALLY VARIABLE TRANSMISSIONS FOR OFF-ROAD VEHICLES

(71) Applicant: Arctic Cat Inc., Thief River Falls, MN (US)

(72) Inventor: Kyle D. Olason, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 341 days.

(21) Appl. No.: 18/408,985

(22) Filed: Jan. 10, 2024

(65) Prior Publication Data

US 2025/0144995 A1 May 8, 2025

Related U.S. Application Data

(60) Provisional application No. 63/596,478, filed on Nov. 6, 2023.

(51) Int. Cl.

*B60K 6/543* (2007.10)
*B60K 6/365* (2007.10)
*B60K 6/40* (2007.10)
*B60K 6/442* (2007.10)
*F16H 3/72* (2006.01)

(Continued)

(52) U.S. Cl.

CPC .............. *B60K 6/543* (2013.01); *B60K 6/365* (2013.01); *B60K 6/40* (2013.01); *B60K 6/442* (2013.01); *F16H 3/728* (2013.01); *F16H 61/66* (2013.01); *B60Y 2200/92* (2013.01);

(Continued)

(58) Field of Classification Search

CPC ........ B60K 6/365; B60K 6/543; B60K 3/728; F16H 2200/2007; F16H 2200/202; F16H 2200/2023

See application file for complete search history.

(56) References Cited

U.S. PATENT DOCUMENTS 6,527,658 B2 3/2003 Holmes et al.
7,572,201 B2 * 8/2009 Supina .................... B60L 50/61 475/5

(Continued)

FOREIGN PATENT DOCUMENTS

CN 107444099 A * 12/2017 ............. B60K 6/365
DE 102010004303 A1 * 1/2011 ............. F16H 3/728

*Primary Examiner* — Stacey A Fluhart

(74) *Attorney, Agent, or Firm* — Billion & Armitage

(57) ABSTRACT

An electrically variable transmission for an off-road vehicle including an internal combustion engine with a crankshaft. The electrically variable transmission includes a compound planetary gear assembly having a first planetary gear set with a first ring gear, a first sun gear and a first planet carrier and a second planetary gear set with a second ring gear, a second sun gear and a second planet carrier. The planet carriers are coupled together for common rotation and are coupled to an output gear for common rotation therewith. The first ring gear is in torque transferring communication with the crankshaft. The first sun gear is in torque transferring communication with a first motor generator. The second sun gear is in torque transferring communication with a second motor generator. The rotational axes of the compound planetary gear assembly and each of the motor generators are parallel rotational axes.

20 Claims, 13 Drawing Sheets

(51) Int. Cl.
*F16H 61/66* (2006.01)
*B62M 27/02* (2006.01)

(52) U.S. Cl.
CPC ..... *B62M 27/02* (2013.01); *F16H 2061/6603* (2013.01); *F16H 2200/2007* (2013.01)

(56) References Cited

U.S. PATENT DOCUMENTS

| | | | | |
|---|---|---|---|---|
| 8,602,938 | B1 | 12/2013 | Conlon et al. | |
| 8,662,239 | B2 * | 3/2014 | Takagi | B60K 6/48 180/65.245 |
| 9,038,754 | B2 | 5/2015 | Takagi | |
| 10,118,477 | B2 | 11/2018 | Borud et al. | |
| 10,688,858 | B2 | 6/2020 | Gassmann et al. | |
| 10,744,868 | B2 | 8/2020 | Borud et al. | |
| 10,780,770 | B2 | 9/2020 | Kohler et al. | |
| 11,220,171 | B2 | 1/2022 | Weeramantry | |
| 11,420,613 | B1 | 8/2022 | David et al. | |
| 2004/0110592 | A1 * | 6/2004 | Yamauchi | B60K 6/50 903/910 |
| 2006/0148604 | A1 * | 7/2006 | Raghavan | B60K 6/365 475/5 |
| 2006/0175102 | A1 * | 8/2006 | Imazu | B60W 10/08 180/65.235 |
| 2007/0072723 | A1 * | 3/2007 | Klemen | B60K 6/40 475/5 |
| 2010/0048338 | A1 * | 2/2010 | Si | F16H 3/728 475/5 |
| 2017/0274753 | A1 * | 9/2017 | Okuwaki | F16H 37/0806 |
| 2020/0235440 | A1 | 7/2020 | Hao et al. | |
| 2021/0354542 | A1 | 11/2021 | Schleif et al. | |

* cited by examiner

ELECTRICALLY VARIABLE TRANSMISSIONS FOR OFF-ROAD VEHICLES

CROSS-REFERENCE TO RELATED APPLICATIONS

The present application claims the benefit of U.S. Provisional Application No. 63/596,478, filed Nov. 6, 2023, the entire contents of which is hereby incorporated by reference.

TECHNICAL FIELD OF THE DISCLOSURE

The present disclosure relates, in general, to transmissions used in off-road vehicles and, in particular, to electrically variable transmissions that have a compound planetary gear assembly and two motor generators each operating on a parallel rotational axis to provide variator functionality with a compact footprint for off-road vehicles.

BACKGROUND

Off-road vehicles are popular land vehicles used for transportation, recreation and utility purposes. Certain off-road vehicles, such as side-by-side vehicles (SxS) and recreational off-highway vehicles (ROV), have ground-engaging wheels. Some off-road vehicles, such as snowmobiles, have a ground-engaging track. Other off-road vehicles, such as all-terrain vehicles (ATV) and utility task vehicles (UTV), may have either ground-engaging wheels or ground-engaging tracks. Wheeled off-road vehicles that are primarily designed for utility applications may offer high ground clearance, low gear ratios for towing, racks for hauling large loads, large dump boxes and/or high payload capacity. Wheeled off-road vehicles that are primarily designed for recreational applications may offer high performance engines as well as safety features including rollover protection, hard tops, windshields and/or cab enclosure features such as body panels. Tracked off-road vehicles may be used in snowy or icy environments and may be designed for specific applications such as trail, utility, mountain, race and crossover, to name a few.

Both wheeled and tracked off-road vehicles typically utilize a gasoline powered engine that provides torque to the ground-engaging members via a transmission, such as a continuously variable transmission, that helps to provide speed control for the vehicle. It has been found, however, that the belts utilized in continuously variable transmissions tend to experience belt slippage and excessive belt wear during extreme off-road conditions such as in heavy mud or during water crossings in wheeled off-road vehicles and in deep snow or on steep slopes in tracked off-road vehicles. Accordingly, a need has arisen for improved transmissions for off-road vehicles that provide not only variable speed control but also smooth power delivery without the limitations associated with belt-driven continuously variable transmissions.

SUMMARY

In a first aspect, the present disclosure is directed to an electrically variable transmission for an off-road vehicle having an internal combustion engine with a crankshaft. The transmission includes a compound planetary gear assembly having first and second planetary gear sets. The first planetary gear set includes a first ring gear, a first sun gear and a first planet carrier. The second planetary gear set includes a second ring gear, a second sun gear and a second planet carrier. The first and second planet carriers are coupled together for common rotation. The first ring gear is in torque transferring communication with the crankshaft. The compound planetary gear assembly has a first rotational axis. A first motor generator has a first input gear that is in torque transferring communication with the first sun gear. The first input gear has a second rotational axis. A second motor generator has a second input gear that is in torque transferring communication with the second sun gear. The second input gear has a third rotational axis. An output gear is coupled to the first and second planet carriers for common rotation therewith. The first, second and third rotational axes are parallel rotational axes.

In certain embodiments, the crankshaft may have a fourth rotational axis such that the first, second, third and fourth rotational axes are parallel rotational axes. In such embodiments, an output driveshaft in torque transferring communication with the output gear may have a fifth rotational axis such that the first, second, third, fourth and fifth rotational axes are parallel rotational axes. In other embodiments, the crankshaft may have a fourth rotational axis such that the first and fourth rotational axes are common rotational axes. In such embodiments, an output driveshaft in torque transferring communication with the output gear may have a fifth rotational axis such that the first, second, third and fifth rotational axes are parallel rotational axes. In some embodiments, an output driveshaft in torque transferring communication with the output gear may have a fourth rotational axis such that the first, second, third and fourth rotational axes are parallel rotational axes.

In certain embodiments, in a low speed mode of the vehicle, the second ring gear may be stationary and each of the engine, the first motor generator and the second motor generator may be configurable as an input to the compound planetary gear assembly. In such embodiments, an output torque and an output speed of the compound planetary gear assembly may be controlled by varying at least one of an engine speed, a first motor generator speed and a second motor generator speed. In some embodiments, in an intermediate speed mode of the vehicle, the first sun gear, the second ring gear and the first motor generator may be stationary and each of the engine and the second motor generator may be configurable as an input to the compound planetary gear assembly. In such embodiments, an output torque and an output speed of the compound planetary gear assembly may be controlled by varying at least one of an engine speed and a second motor generator speed. Also, in such embodiments, the second motor generator may be configurable as an output of the compound planetary gear assembly operable to charge a battery. In certain embodiments, in a high speed mode of the vehicle, the first input gear of the first motor generator may be in torque transferring communication with the first sun gear and the second ring gear, and each of the engine, the first motor generator and the second motor generator may be configurable as an input to the compound planetary gear assembly. In such embodiments, an output torque and an output speed of the compound planetary gear assembly may be controlled by varying at least one of an engine speed, a first motor generator speed and a second motor generator speed. Also, in such embodiments, each the first motor generator and the second motor generator may be configurable as an output of the compound planetary gear assembly operable to charge a battery.

In a second aspect, the present disclosure is directed to an off-road vehicle including an internal combustion engine with a crankshaft. A compound planetary gear assembly has first and second planetary gear sets. The first planetary gear set includes a first ring gear, a first sun gear and a first planet carrier. The second planetary gear set includes a second ring gear, a second sun gear and a second planet carrier. The first and second planet carriers are coupled together for common rotation. The first ring gear is in torque transferring communication with the crankshaft. The compound planetary gear assembly has a first rotational axis. A first motor generator has a first input gear that is in torque transferring communication with the first sun gear. The first input gear has a second rotational axis. A second motor generator has a second input gear that is in torque transferring communication with the second sun gear. The second input gear has a third rotational axis. An output gear is coupled to the first and second planet carriers for common rotation therewith. At least one ground-engaging member is in torque transferring communication with the output gear. The at least one ground-engaging member is configured to provide ground propulsion for the vehicle responsive to torque from the output gear. The first, second and third rotational axes are parallel rotational axes.

In some embodiments, the off-road vehicle may be a wheeled off-road vehicle. In other embodiments, the off-road vehicle may be a tracked off-road vehicle. In certain embodiments, the compound planetary gear assembly may be positioned aft of the internal combustion engine. In other embodiments, the compound planetary gear assembly may be positioned forward of the internal combustion engine. In further embodiments, the compound planetary gear assembly may be positioned lateral of the internal combustion engine.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
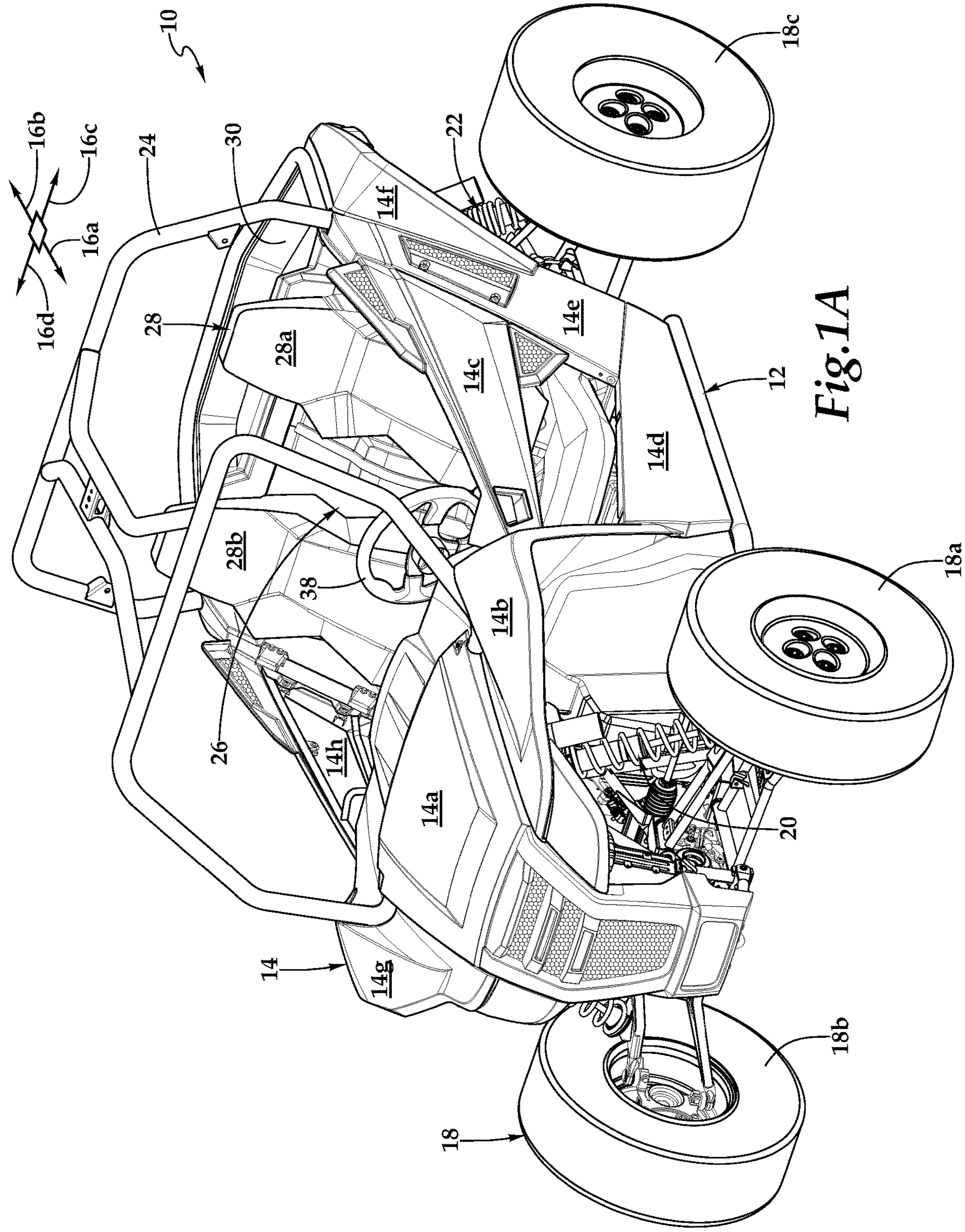
FIGS. 1A-1B are front and rear isometric views of a wheeled off-road vehicle having an electrically variable transmission in accordance with embodiments of the present disclosure.
Figure 1B:
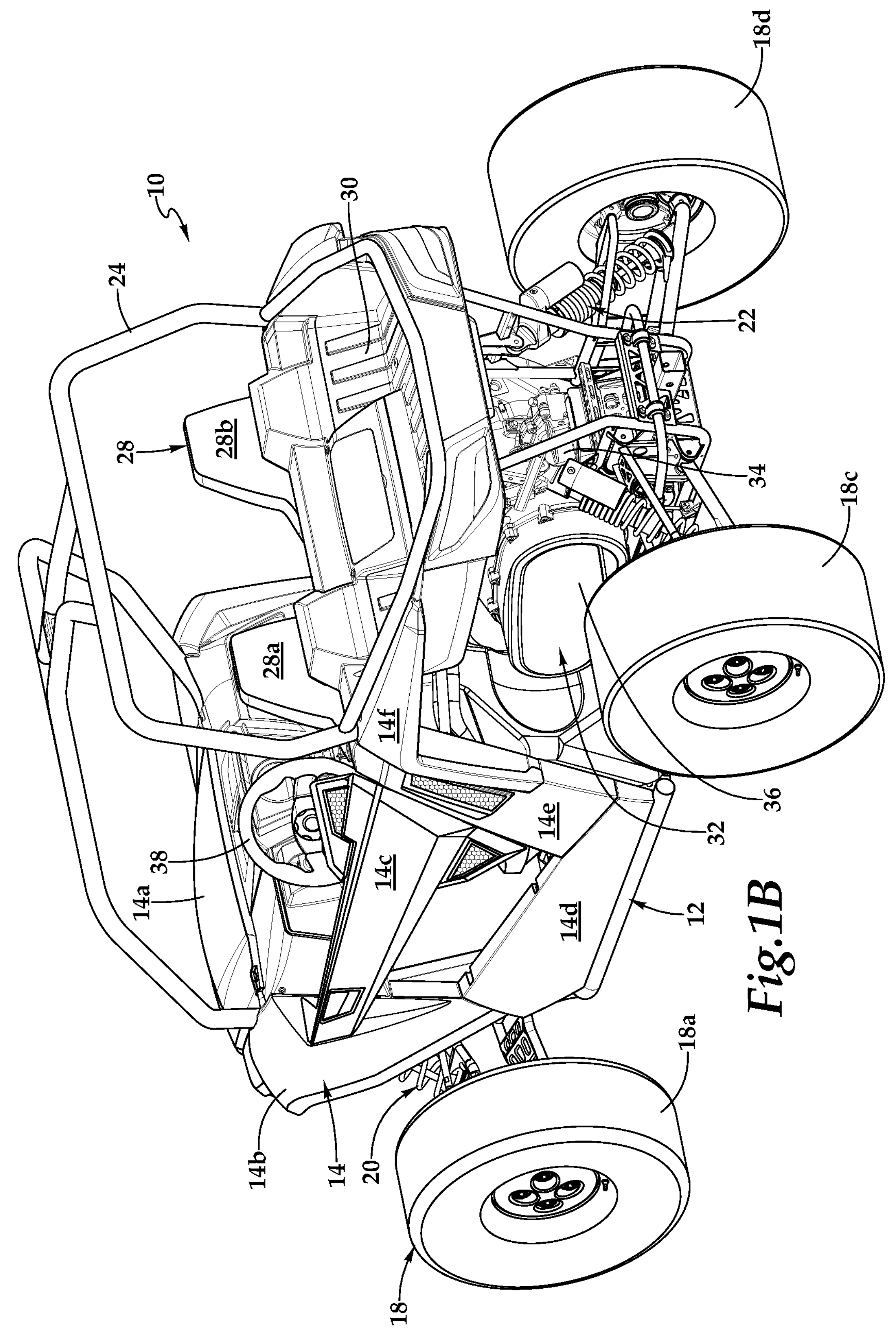

Referring to FIGS. 1A-1B in the drawings, a land vehicle depicted as a wheeled off-road vehicle having an electrically variable transmission is schematically illustrated and generally designated 10. In the illustrated embodiment, wheeled off-road vehicle 10 is a side-by-side vehicle. In other embodiments, wheeled off-road vehicle 10 may be an all-terrain vehicle, a light utility vehicle, a utility-terrain vehicle, a recreational off-highway vehicle, a multipurpose off-highway utility vehicle or the like. Structural support for wheeled off-road vehicle 10 is provided by a frame assembly 12, on or around which the various components of wheeled off-road vehicle 10 are assembled. Frame assembly 12 is formed of a plurality of structural members that are interconnected by welds, bolts, pins, adhesive and/or other suitable fastening means. The structural members may include tubular members, such as round and hollow tubular members, comprised of metal or metal alloy, such as steel or aluminum. Alternatively or additionally, certain structural members may be formed from polymeric materials such as a fiber reinforced polymer composite.

Wheeled off-road vehicle 10 includes a plurality of body panels that cover and protect certain components of wheeled off-road vehicle 10 such as a hood panel 14*a*, a left front fender panel 14*b*, a left door panel 14*c*, a left side panel 14*d*, a left rear panel 14*e* and a left rear fender panel 14*f*. It should be understood by those having ordinary skill in the art that wheeled off-road vehicle 10 has similar body panels on the right side of the vehicle including a right front fender panel 14*g*, a right door panel 14*h*, a right side panel (not visible), a right rear panel (not visible) and a right rear fender panel (not visible) with these and other body panels of wheeled off-road vehicle 10 being collectively referred to herein as body panels 14. Body panels 14 may be formed from sheet metal or metal alloy, such as steel or aluminum, and/or polymeric materials such as fiber reinforced polymer composites. In addition, it should be understood by those having ordinary skill in the art that the right side and the left side of wheeled off-road vehicle 10 will be with reference to a forward-facing occupant of wheeled off-road vehicle 10 with the right side of wheeled off-road vehicle 10 corresponding to the right side of the occupant and the left side of wheeled off-road vehicle 10 corresponding to the left side of the occupant. The forward direction of wheeled off-road vehicle 10 is indicated by forward arrow 16*a* and the backward direction of wheeled off-road vehicle 10 is indicated by backwards arrow 16*b*. The forward and backward directions also represent the longitudinal direction of wheeled off-road vehicle 10 with the lateral direction of wheeled off-road vehicle 10 being normal thereto and represented by a leftward arrow 16*c* and a rightward arrow 16*d*. The backward direction may also be referred to herein as the aftward direction.

Wheeled off-road vehicle 10 includes a plurality of ground-engaging members depicted as four wheels 18 including front wheels 18*a*, 18*b* that are coupled to frame assembly 12 by a front suspension 20 and rear wheels 18*c*, 18*d* that are coupled to frame assembly 12 by a rear suspension 22. Frame assembly 12 includes a rollover protection structure 24 that at least partially defines an occupant space 26 within wheeled off-road vehicle 10. In the illustrated embodiment, occupant space 26 includes a seating assembly 28 depicted as a pair of bucket seats; namely, a driver seat 28*a* and a passenger seat 28*b* in a side-by-side arrangement. In other embodiments, the occupant space of a wheeled off-road vehicle may have a bench seating arrangement. In still other embodiments, the occupant space of a wheeled off-road vehicle may have front and rear seats to accommodate additional occupants such as a total of four, six or more occupants. Positioned aft of seating assembly 28, wheeled off-road vehicle 10 includes a cargo storage area 30.

Wheeled off-road vehicle 10 has a powertrain 32 that includes an engine 34 and an electrically variable transmission 36, both of which are coupled to frame assembly 12. Engine 34 may be an internal combustion engine such as a two-stroke or four-stroke gasoline powered engine having two, three, four or more cylinders. Engine 34 may be naturally aspirated or include a power adder such as a supercharger or a turbocharger. In the illustrated embodiment, electrically variable transmission 36 includes a compound planetary gear assembly and two motor generators each operating on a parallel rotational axis for varying the ratio of the engine output speed to the input speed to wheels 18. By configuring the operative components of electrically variable transmission 36 on three parallel rotational axes instead of a single common rotational axis typically found in electrically variable transmissions, electrically variable transmission 36 has a compact footprint making it suitable for use on wheeled off-road vehicles. In the illustrated embodiment, wheeled off-road vehicle 10 is a four-wheel drive vehicle in which powertrain 32 is operatively coupled to front wheels 18*a*, 18*b* via a front differential and to rear wheels 18*c*, 18*d* via a transaxle or rear differential. In other embodiments, wheeled off-road vehicle 10 may be a two-wheel drive vehicle such as a rear-wheel drive vehicle in which the powertrain is coupled to only the rear wheels or a front-wheel drive vehicle in which the powertrain is coupled to only the front wheels.

Positioned within occupant space 26, wheeled off-road vehicle 10 includes a steering wheel 38 that is coupled to front wheels 18*a*, 18*b* via a steering linkage. Wheeled off-road vehicle 10 may having a power steering system such as an electric power steering system coupled to the steering linkage, a hydraulically assisted power steering system, an electric power steering system without a mechanical linkage such as a drive-by-wire system, an electric assisted power steering system or other suitable steering system. Wheeled off-road vehicle 10 may also include a gear shift selector that is coupled to transmission 36 that enables the driver to shift wheeled off-road vehicle 10 between various diving modes including forward and reverse driving modes.

Figure 2A:
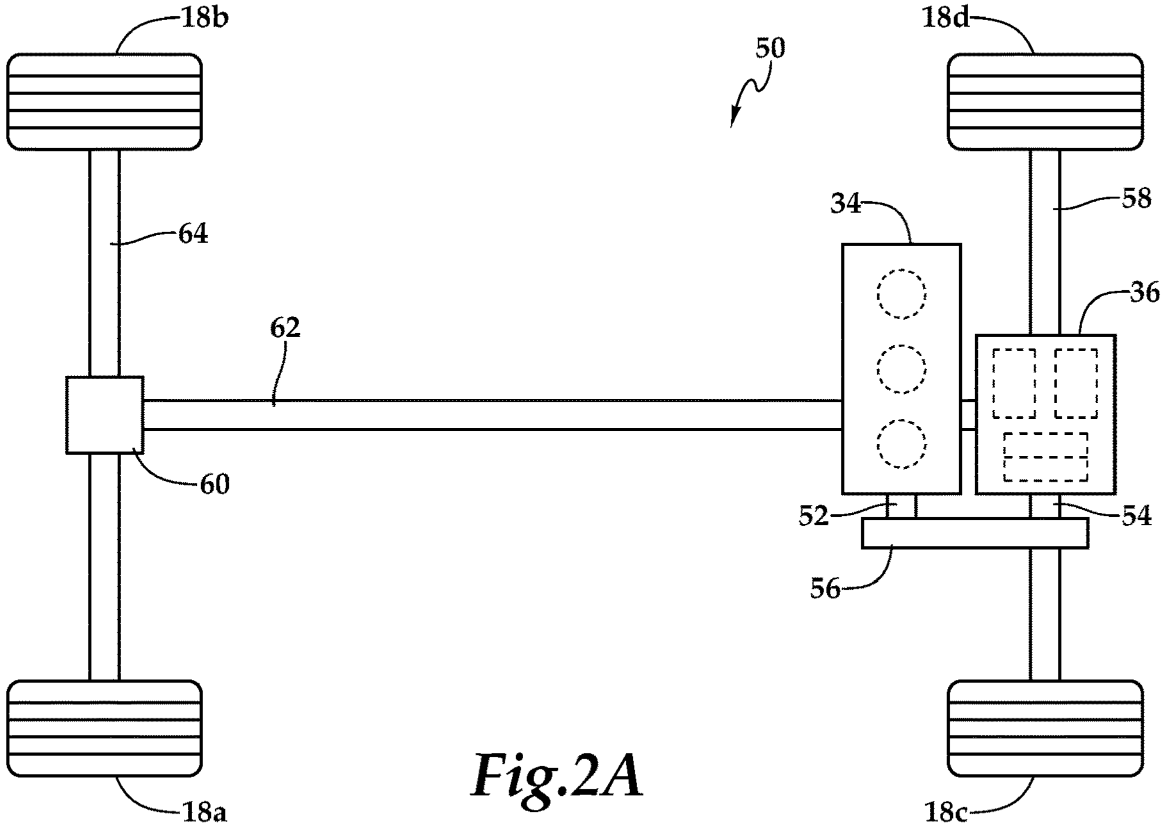
FIGS. 2A-2E are schematic illustrations of various powertrains for a wheeled off-road vehicle having an electrically variable transmission in accordance with embodiments of the present disclosure.

Referring next to FIGS. 2A-2E in the drawings, various powertrain configurations suitable for use in a wheeled off-road vehicle such as wheeled off-road vehicle 10 will now be disclosed. In FIG. 2A, a powertrain 50 for a wheeled off-road vehicle includes engine 34 and electrically variable transmission 36. Engine 34 is depicted as a three cylinder, four-stroke engine and electrically variable transmission 36 is depicted as including a compound planetary gear assembly and two motor generators each operating on a parallel rotational axis. The crankshaft 52 of engine 34 is in torque transferring communication with an input shaft 54 of electrically variable transmission 36 via a belt or chain drive mechanism 56. In the illustrated embodiment, electrically variable transmission 36 forms a part of a transaxle that provides torque to the final drive, depicted as rear axle 58 that rotates rear wheels 18*c*, 18*d*. It should be noted that rear axle 58 may be formed from two half shafts or other suitable connection between the transaxle and rear wheels 18*c*, 18*d*. Electrically variable transmission 36 is also coupled to a front differential 60 via a drive shaft 62. Front differential 60 provides torque to front axle 64 which rotates front wheels 18*a*, 18*b*. It should be noted that front axle 64 may be formed from two half shafts or other suitable connection between front differential 60 and front wheels 18*a*, 18*b*. In the illustrated embodiment, electrically variable transmission 36 including the compound planetary gear assembly is positioned aft of engine 34 and is configured such that the rotational axis of crankshaft 52 is parallel to each of the rotational axes of the compound planetary gear assembly and the two motor generators with each of the rotational axes extending substantially in the lateral direction of the vehicle.

Figure 2B:
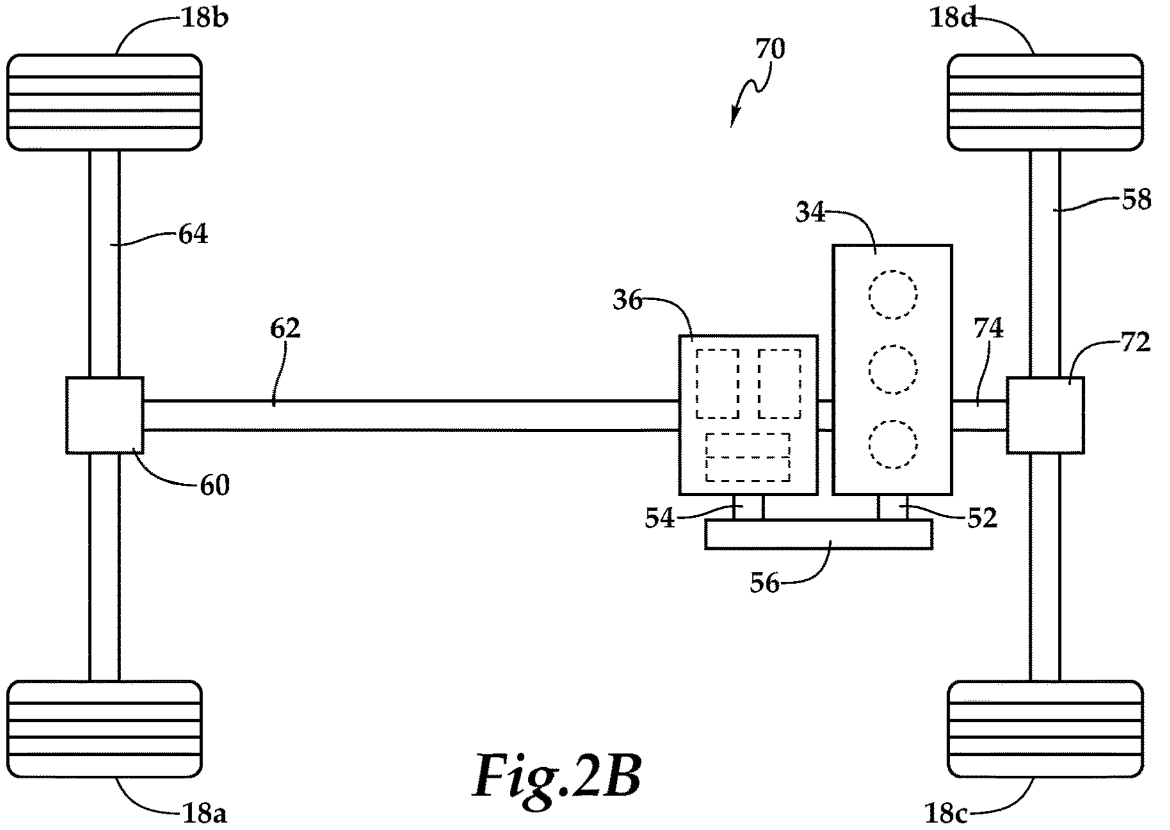

In FIG. 2B, a powertrain 70 for a wheeled off-road vehicle includes engine 34 and electrically variable transmission 36. Engine 34 is depicted as a three cylinder, four-stroke engine and electrically variable transmission 36 is depicted as including a compound planetary gear assembly and two motor generators each operating on a parallel rotational axis. Crankshaft 52 of engine 34 is in torque transferring communication with input shaft 54 of electrically variable transmission 36 via drive mechanism 56. In the illustrated embodiment, electrically variable transmission 36 is coupled to a rear differential 72 via a drive shaft 74. Rear differential 72 provides torque to rear axle 58 which rotates rear wheels 18*c*, 18*d*. Electrically variable transmission 36 is also coupled to a front differential 60 via a drive shaft 62. Front differential 60 provides torque to front axle 64 which rotates front wheels 18*a*, 18*b*. In the illustrated embodiment, electrically variable transmission 36 including the compound planetary gear assembly is positioned forward of engine 34 and is configured such that the rotational axis of crankshaft 52 is parallel to each of the rotational axes of the compound planetary gear assembly and the two motor generators with each of the rotational axes extending substantially in the lateral direction of the vehicle.

Figure 2C:
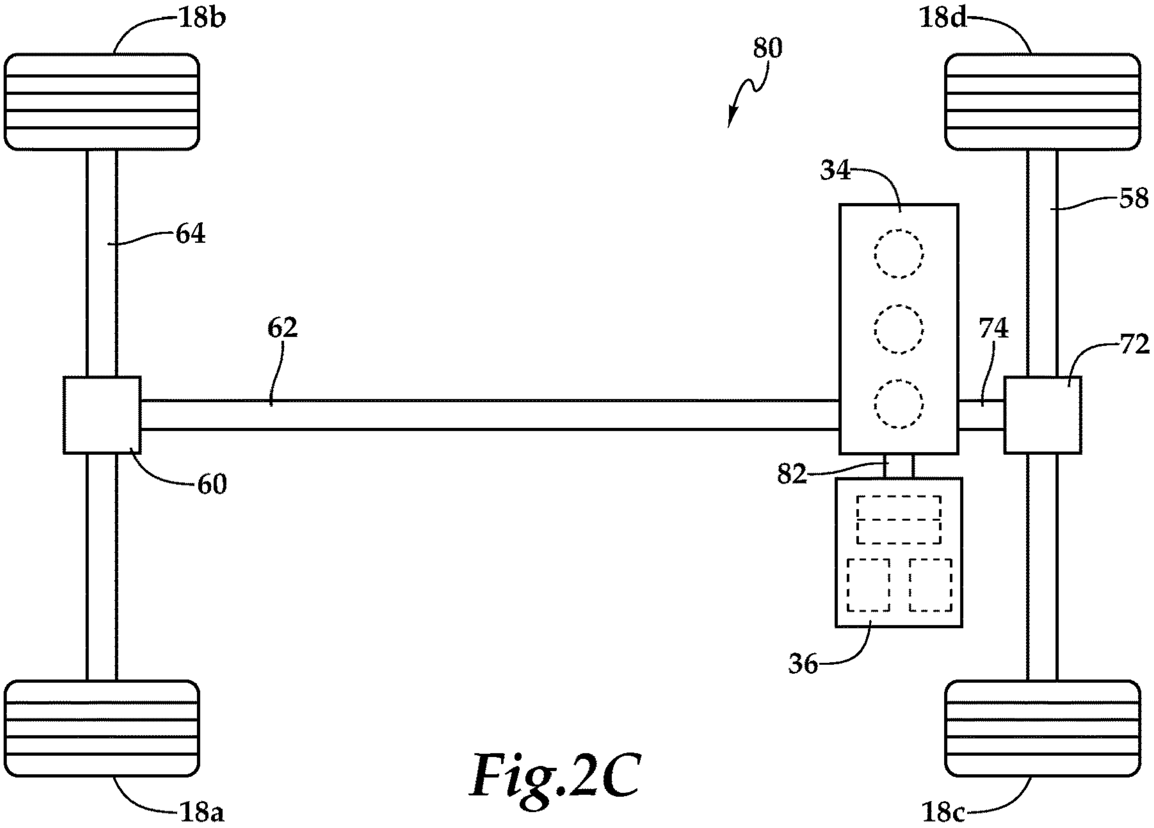

In FIG. 2C, a powertrain 80 for a wheeled off-road vehicle includes engine 34 and electrically variable transmission 36. Engine 34 is depicted as a three cylinder, four-stroke engine and electrically variable transmission 36 is depicted as including a compound planetary gear assembly and two motor generators each operating on a parallel rotational axis. The crankshaft of engine 34 is in torque transferring communication with the input shaft of electrically variable transmission 36 via a shaft coupling 82. In the illustrated embodiment, electrically variable transmission 36 is coupled to a rear differential 72 via a drive shaft 74. Rear differential 72 provides torque to rear axle 58 which rotates rear wheels 18*c*, 18*d*. Electrically variable transmission 36 is also coupled to a front differential 60 via a drive shaft 62. Front differential 60 provides torque to front axle 64 which rotates front wheels 18*a*, 18*b*. In the illustrated embodiment, electrically variable transmission 36 including the compound planetary gear assembly is positioned lateral of engine 34 and is configured such that the rotational axis of the crankshaft is common with the rotational axis of the compound planetary gear assembly and parallel to the rotational axes of the two motor generators with each of the rotational axes extending substantially in the lateral direction of the vehicle.

Figure 2D:
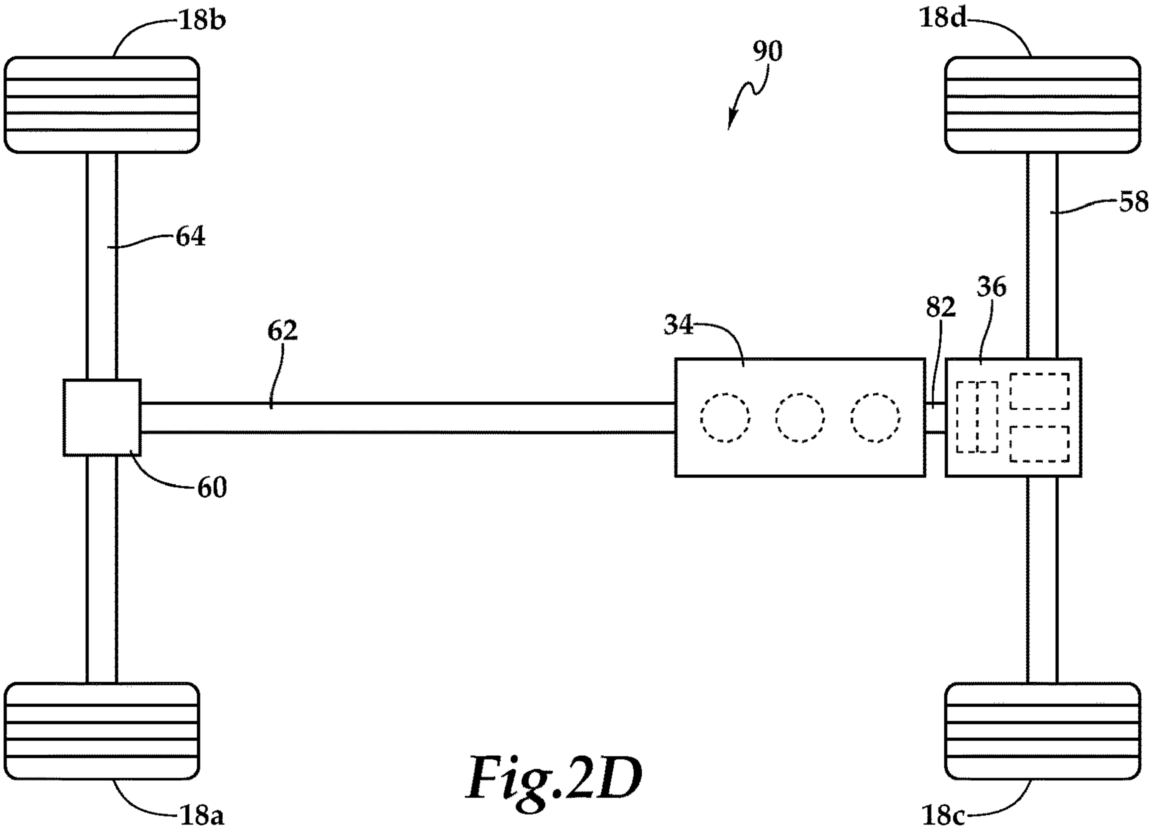

In FIG. 2D, a powertrain 90 for a wheeled off-road vehicle includes engine 34 and electrically variable transmission 36. Engine 34 is depicted as a three cylinder, four-stroke engine and electrically variable transmission 36 is depicted as including a compound planetary gear assembly and two motor generators each operating on a parallel rotational axis. The crankshaft of engine 34 is in torque transferring communication with the input shaft of electrically variable transmission 36 via a shaft coupling 82. In the illustrated embodiment, electrically variable transmission 36 forms a part of a transaxle that provides torque to rear axle 58 that rotates rear wheels 18*c*, 18*d*. Electrically variable transmission 36 is also coupled to front differential 60 via drive shaft 62. Front differential 60 provides torque to front axle 64 which rotates front wheels 18*a*, 18*b*. In the illustrated embodiment, electrically variable transmission 36 including the compound planetary gear assembly is positioned aft of engine 34 and is configured such that the rotational axis of the crankshaft is common with the rotational axis of the compound planetary gear assembly and parallel to the rotational axes of the two motor generators with each of the rotational axes extending substantially in the longitudinal direction of the vehicle.

Figure 2E:
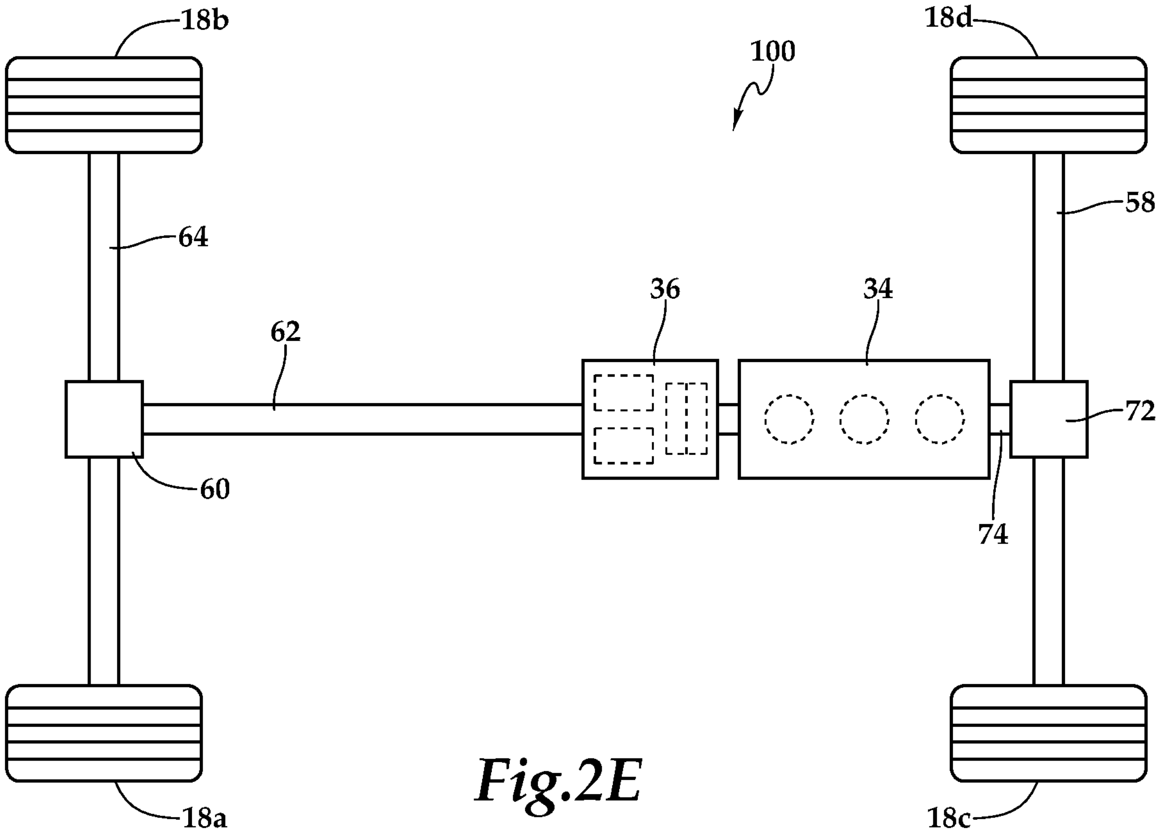

In FIG. 2E, a powertrain 100 for a wheeled off-road vehicle includes engine 34 and electrically variable transmission 36. Engine 34 is depicted as a three cylinder, four-stroke engine and electrically variable transmission 36 is depicted as including a compound planetary gear assembly and two motor generators each operating on a parallel rotational axis. The crankshaft of engine 34 is in torque transferring communication with the input shaft of electrically variable transmission 36 via a shaft coupling 82. In the illustrated embodiment, electrically variable transmission 36 is coupled to a rear differential 72 via a drive shaft 74. Rear differential 72 provides torque to rear axle 58 which rotates rear wheels 18*c*, 18*d*. Electrically variable transmission 36 is also coupled to a front differential 60 via a drive shaft 62. Front differential 60 provides torque to front axle 64 which rotates front wheels 18*a*, 18*b*. In the illustrated embodiment, electrically variable transmission 36 including the compound planetary gear assembly is positioned forward of engine 34 and is configured such that the rotational axis of the crankshaft is common with the rotational axis of the compound planetary gear assembly and parallel to the rotational axes of the two motor generators with each of the rotational axes extending substantially in the longitudinal direction of the vehicle.

Figure 3A:
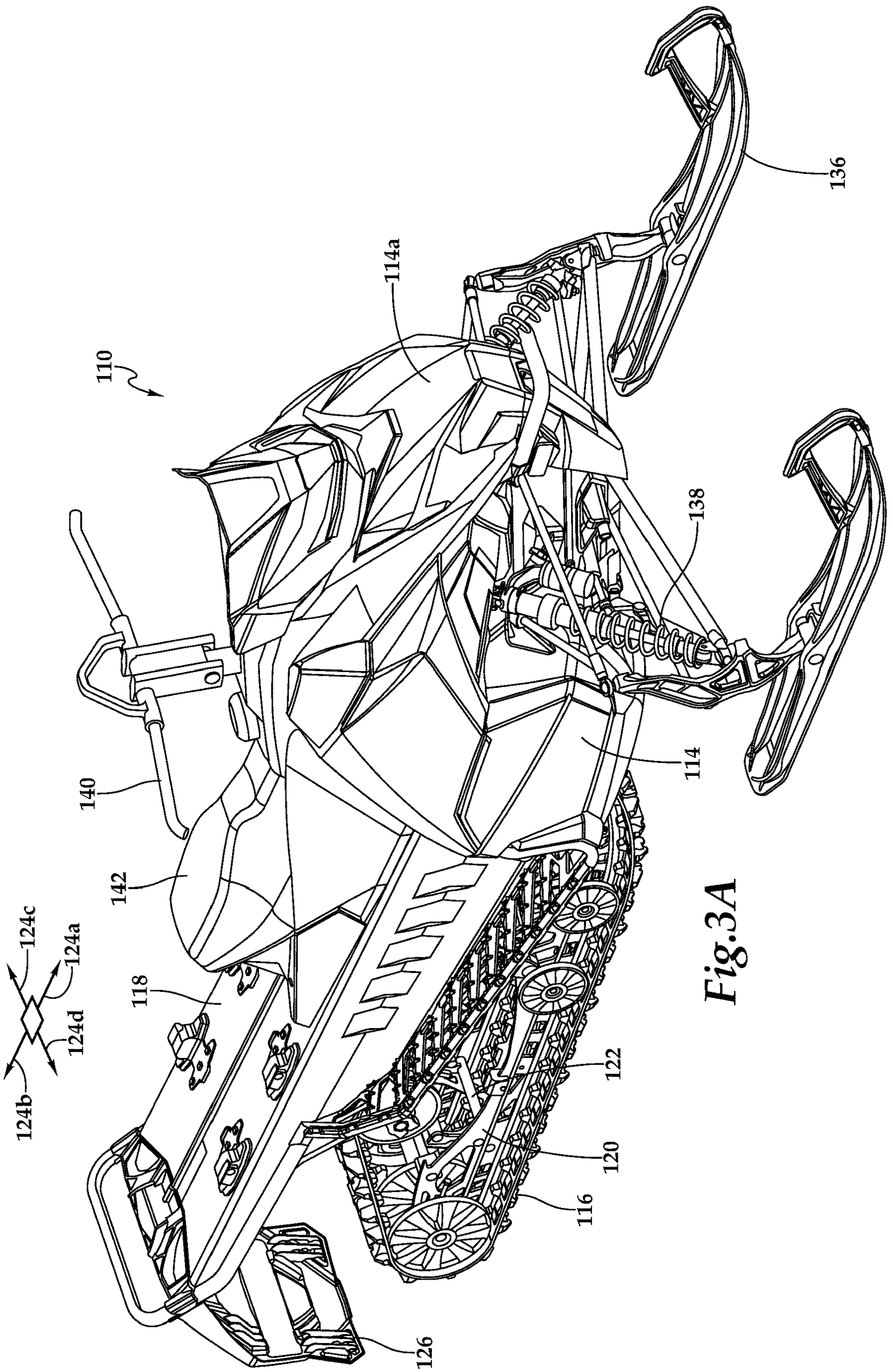
FIGS. 3A-3B are front isometric and right side views of a tracked off-road vehicle having an electrically variable transmission in accordance with embodiments of the present disclosure.
Figure 3B:
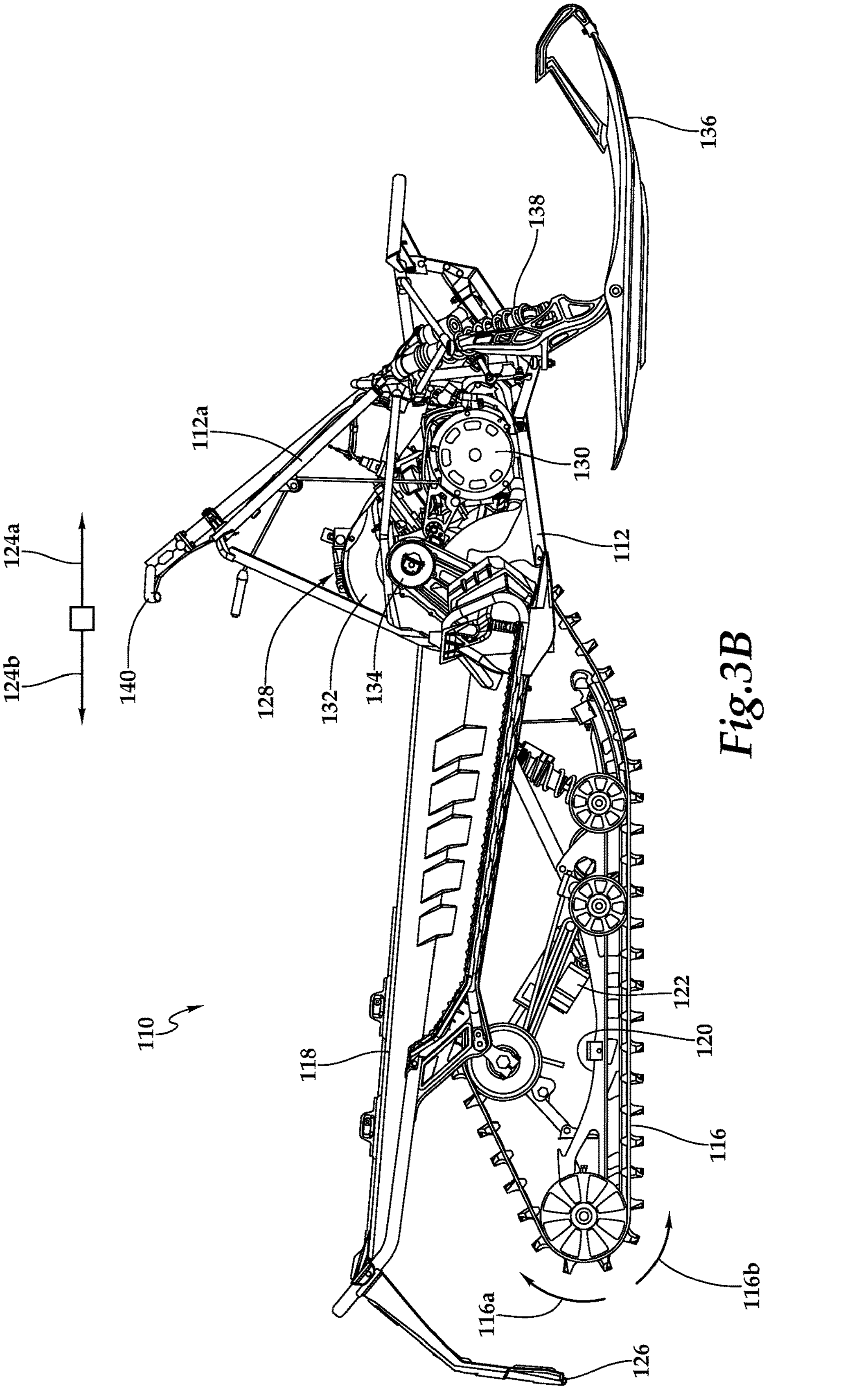

Referring now to FIGS. 3A-3B in the drawings, a tracked off-road vehicle depicted as a snowmobile having an electrically variable transmission is schematically illustrated and generally designated 110. Structural support for snowmobile 110 is provided by chassis 112, on or around which the various components of snowmobile 110 are assembled. Chassis 112 includes a forward frame assembly 112*a* formed from interconnected tubular members. One or more shrouds 114 cover and protect the various components of snowmobile 110 including parts of chassis 112. For example, a front shroud 114*a* shields underlying componentry from snow and shields the operator of snowmobile 110 from oncoming terrain and cold air during operation. Shrouds 114 have been removed in FIG. 3B to illustrate underlying components of snowmobile 110 including chassis 112. A ground-engaging member depicted as a drive track 116 is at least partially disposed within a tunnel 118 and is in contact with the ground to provide ground propulsion for snowmobile 110. Drive track 116 is supported by a track frame 120 having an internal suspension 122. Drive track 116 rotates around track frame 120 in either direction 116*a* to propel snowmobile 110 forward or direction 116*b* to propel snowmobile 110 backward. The forward direction of snowmobile 110 is indicated by forward arrow 124*a* and the backward direction of snowmobile 110 is indicated by backwards arrow 124*b*. The forward and backward directions also represent the longitudinal direction of snowmobile 110 with the lateral direction of snowmobile 110 being normal thereto and represented by a leftward arrow 124*c* and a rightward arrow 124*d*. The backward direction may also be referred to herein as the aftward direction. A rear flap 126 deflects snow emitted by drive track 116.

Snowmobile 110 has a powertrain 128 including an engine 130 and an electrically variable transmission 132 that are coupled to chassis 112 and provide torque and rotational energy to rotate drive track 116 around track frame 120. Engine 130 may be an internal combustion engine such as a two-stroke or four-stroke gasoline powered engine having two, three, four or more cylinders. Engine 130 may be naturally aspirated or include a power adder such as a supercharger or a turbocharger. In the illustrated embodiment, electrically variable transmission 132 includes a compound planetary gear assembly and two motor generators each operating on a parallel rotational axis for varying the ratio of the engine output speed to the input speed to drive track 116. By configuring the operative components of electrically variable transmission 132 on three parallel rotational axes instead of a single common rotational axis typically found in electrically variable transmissions, electrically variable transmission 132 has a compact footprint making it suitable for use on tracked off-road vehicles. In the illustrated embodiment, powertrain 128 also includes a belt drive assembly 134 that is positioned in torque transferring communication between electrically variable transmission 132 and drive track 116. Belt drive assembly 134 may be used to switch snowmobile 110 between forward and reverse modes. Alternatively, the forward and reverse modes of snowmobile 110 may be controlled directly by electrically variable transmission 132. Snowmobile 110 includes skis 136 and a front suspension assembly 138 that provide front end support for snowmobile 110. Skis 136 are interconnected to handlebar 140 that is used by an operator to steer snowmobile 110. The operator controls snowmobile 110 from a seat 142 positioned atop tunnel 118 and behind handlebar 140.

Figure 4A:
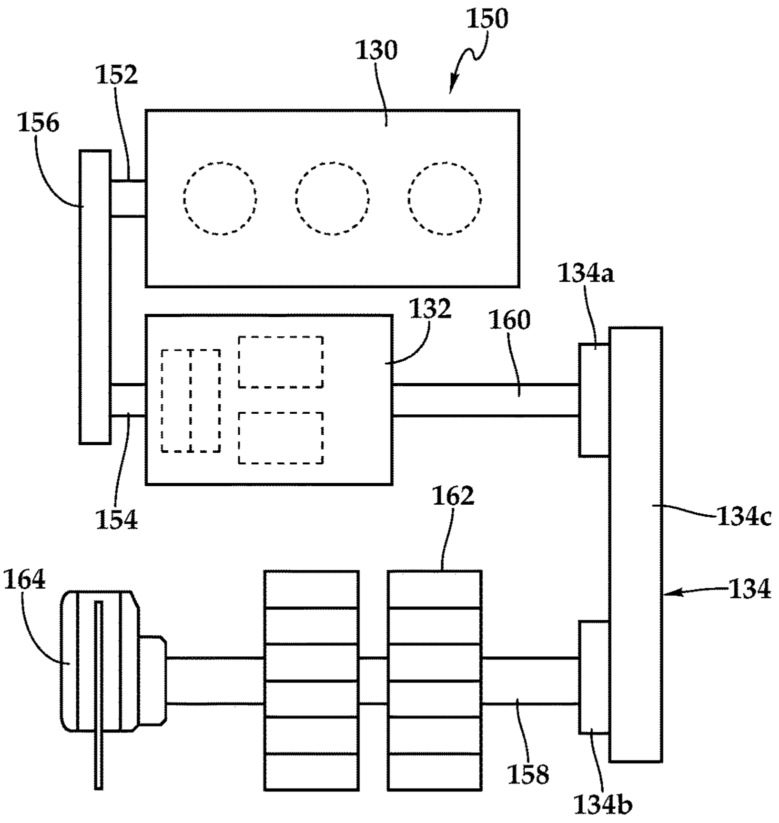
FIGS. 4A-4D are schematic illustrations of various powertrains for a tracked off-road vehicle having an electrically variable transmission in accordance with embodiments of the present disclosure.

Referring to FIGS. 4A-4D in the drawings, various powertrain configurations suitable for use in a tracked off-road vehicle such as snowmobile 110 will now be disclosed. In FIG. 4A, a powertrain 150 for a tracked off-road vehicle includes engine 130 and electrically variable transmission 132. Engine 130 is depicted as a three cylinder, four-stroke engine and electrically variable transmission 132 is depicted as including a compound planetary gear assembly and two motor generators each operating on a parallel rotational axis. The crankshaft 152 of engine 130 is in torque transferring communication with an input shaft 154 of electrically variable transmission 132 via a belt or chain drive mechanism 156. Torque is provided from electrically variable transmission 132 to the final drive, depicted as track driveshaft 158, via a jack shaft 160 and belt drive assembly 134 that includes a top pulley 134*a*, a bottom pulley 134*b* and a drive belt 134*c*. As illustrated, track driveshaft 158 transfer torque from bottom pulley 134*b* to drive track sprockets 162, which engage the inside of drive track 116 to provide torque and rotational energy thereto and thus to propel the tracked off-road vehicle. A disc-and-caliper braking system 164 is located at the end of track driveshaft 158 opposite of belt drive assembly 134. Braking system 164 is used to slow or stop track driveshaft 158, thereby slowing or stopping the tracked off-road vehicle. In the illustrated embodiment, electrically variable transmission 132 including the compound planetary gear assembly is positioned aft of engine 130 and is configured such that the rotational axis of crankshaft 152 is parallel to each of the rotational axes of the compound planetary gear assembly and the two motor generators with each of the rotational axes extending substantially in the lateral direction of the vehicle.

Figure 4B:
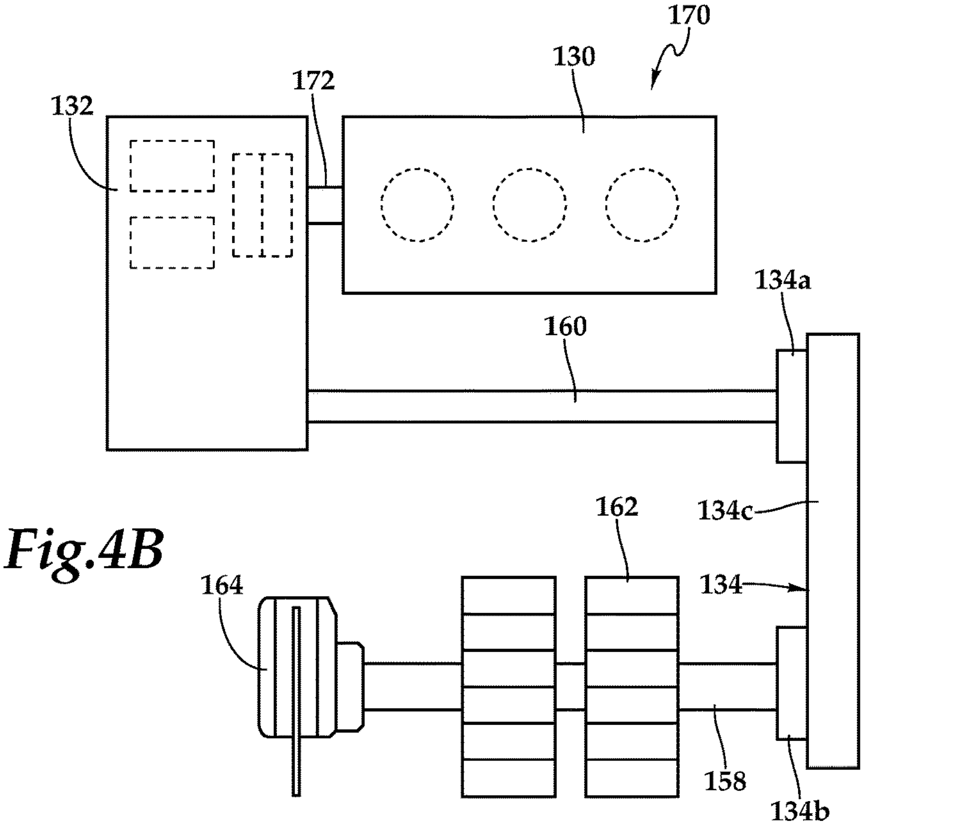

In FIG. 4B, a powertrain 170 for a tracked off-road vehicle includes engine 130 and electrically variable transmission 132. Engine 130 is depicted as a three cylinder, four-stroke engine and electrically variable transmission 132 is depicted as including a compound planetary gear assembly and two motor generators each operating on a parallel rotational axis. The crankshaft of engine 130 is in torque transferring communication with the input shaft of electrically variable transmission 132 via a shaft coupling 172. Torque is provided from electrically variable transmission 132 to track driveshaft 158 via jack shaft 160 and belt drive assembly 134 that includes top pulley 134*a*, bottom pulley 134*b* and drive belt 134*c*. As illustrated, track driveshaft 158 transfers torque from bottom pulley 134*b* to drive track sprockets 162, which engage the inside of drive track 116 to provide torque and rotational energy thereto and thus to propel the tracked off-road vehicle. A disc-and-caliper braking system 164 is located at the end of track driveshaft 158 opposite of belt drive assembly 134. Braking system 164 is used to slow or stop track driveshaft 158, thereby slowing or stopping the tracked off-road vehicle. In the illustrated embodiment, electrically variable transmission 132 including the compound planetary gear assembly is positioned lateral of engine 130 and is configured such that the rotational axis of the crankshaft is common with the rotational axis of the compound planetary gear assembly and parallel to the rotational axes of the two motor generators with each of the rotational axes extending substantially in the lateral direction of the vehicle.

Figure 4C:
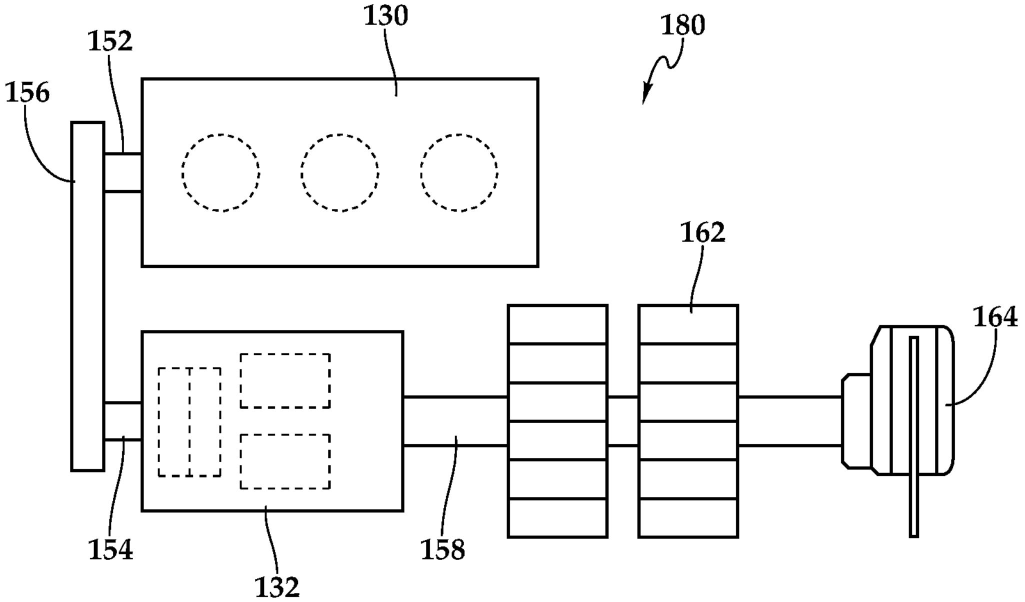

In FIG. 4C, a powertrain 180 for a tracked off-road vehicle includes engine 130 and electrically variable transmission 132. Engine 130 is depicted as a three cylinder, four-stroke engine and electrically variable transmission 132 is depicted as including a compound planetary gear assembly and two motor generators each operating on a parallel rotational axis. The crankshaft 152 of engine 130 is in torque transferring communication with an input shaft 154 of electrically variable transmission 132 via a belt or chain drive mechanism 156. Torque is provided from electrically variable transmission 132 directly to the final drive by track driveshaft 158. As illustrated, track driveshaft 158 transfer torque to drive track sprockets 162, which engage the inside of the drive track to provide torque and rotational energy thereto and thus to propel the tracked off-road vehicle. A disc-and-caliper braking system 164 is located at the end of track driveshaft 158. Braking system 164 is used to slow or stop track driveshaft 158, thereby slowing or stopping the tracked off-road vehicle. In the illustrated embodiment, electrically variable transmission 132 including the compound planetary gear assembly is positioned aft of engine 130 and is configured such that the rotational axis of crankshaft 152 is parallel to each of the rotational axes of the compound planetary gear assembly and the two motor generators with each of the rotational axes extending substantially in the lateral direction of the vehicle.

Figure 4D:
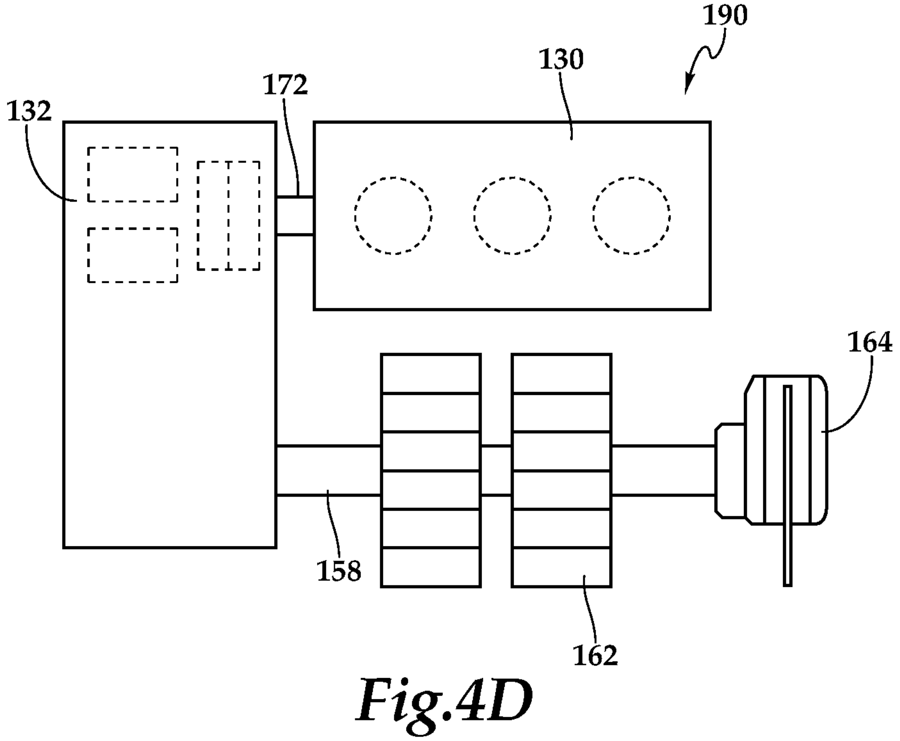

In FIG. 4D, a powertrain 190 for a tracked off-road vehicle includes engine 130 and electrically variable transmission 132. Engine 130 is depicted as a three cylinder, four-stroke engine and electrically variable transmission 132 is depicted as including a compound planetary gear assembly and two motor generators each operating on a parallel rotational axis. The crankshaft of engine 130 is in torque transferring communication with the input shaft of electrically variable transmission 132 via a shaft coupling 172. Torque is provided from electrically variable transmission 132 directly to track driveshaft 158. As illustrated, track driveshaft 158 transfers torque to drive track sprockets 162, which engage the inside of the drive track to provide torque and rotational energy thereto and thus to propel the tracked off-road vehicle. A disc-and-caliper braking system 164 is located at the end of track driveshaft 158. Braking system 164 is used to slow or stop track driveshaft 158, thereby slowing or stopping the tracked off-road vehicle. In the illustrated embodiment, electrically variable transmission 132 including the compound planetary gear assembly is positioned lateral of engine 130 and is configured such that the rotational axis of the crankshaft is common with the rotational axis of the compound planetary gear assembly and parallel to the rotational axes of the two motor generators with each of the rotational axes extending substantially in the lateral direction of the vehicle.

Figure 5A:
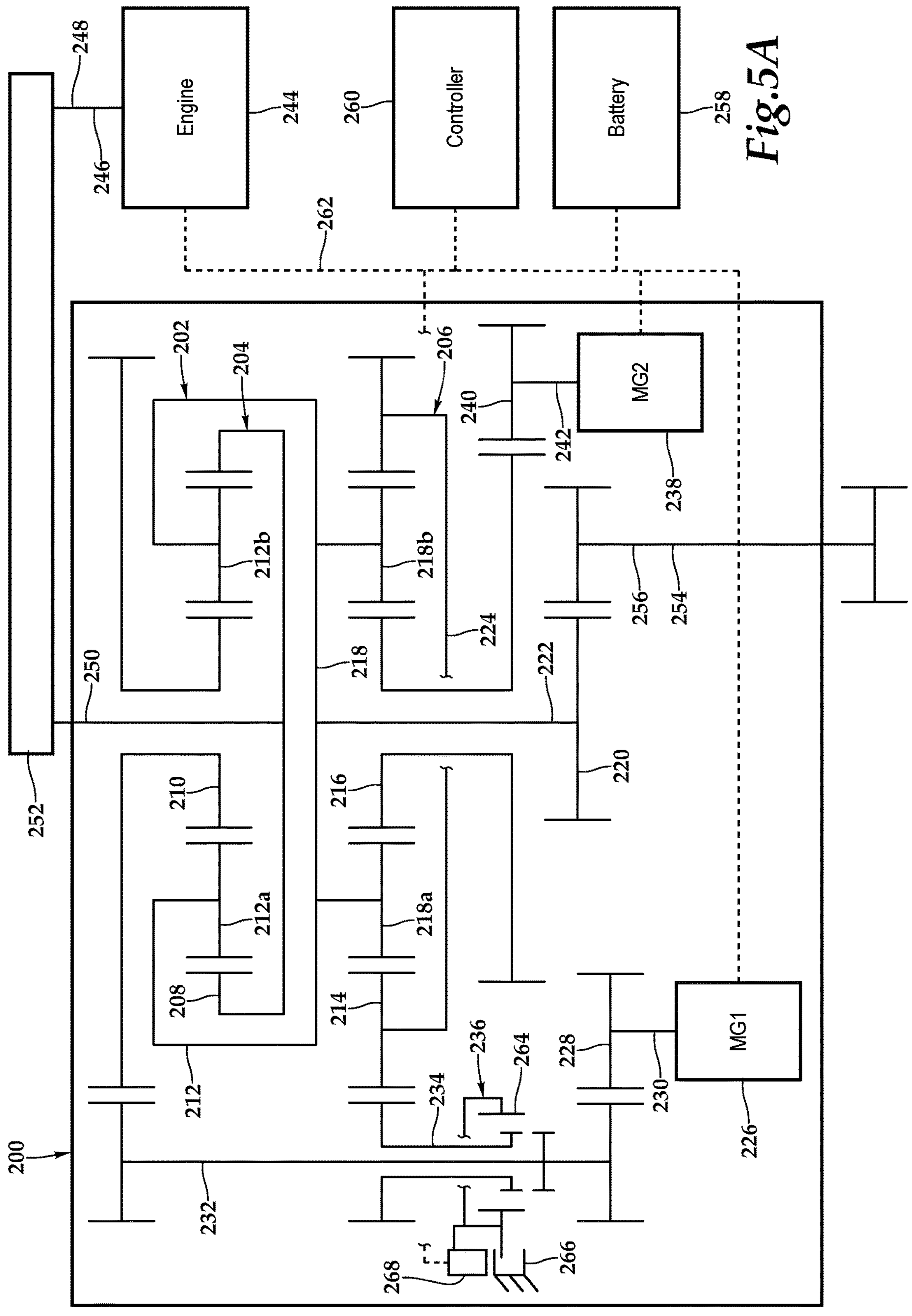
FIGS. 5A-5C are schematic illustrations of a powertrain for an off-road vehicle having an electrically variable transmission in various operating modes in accordance with embodiments of the present disclosure.
Figure 5B:
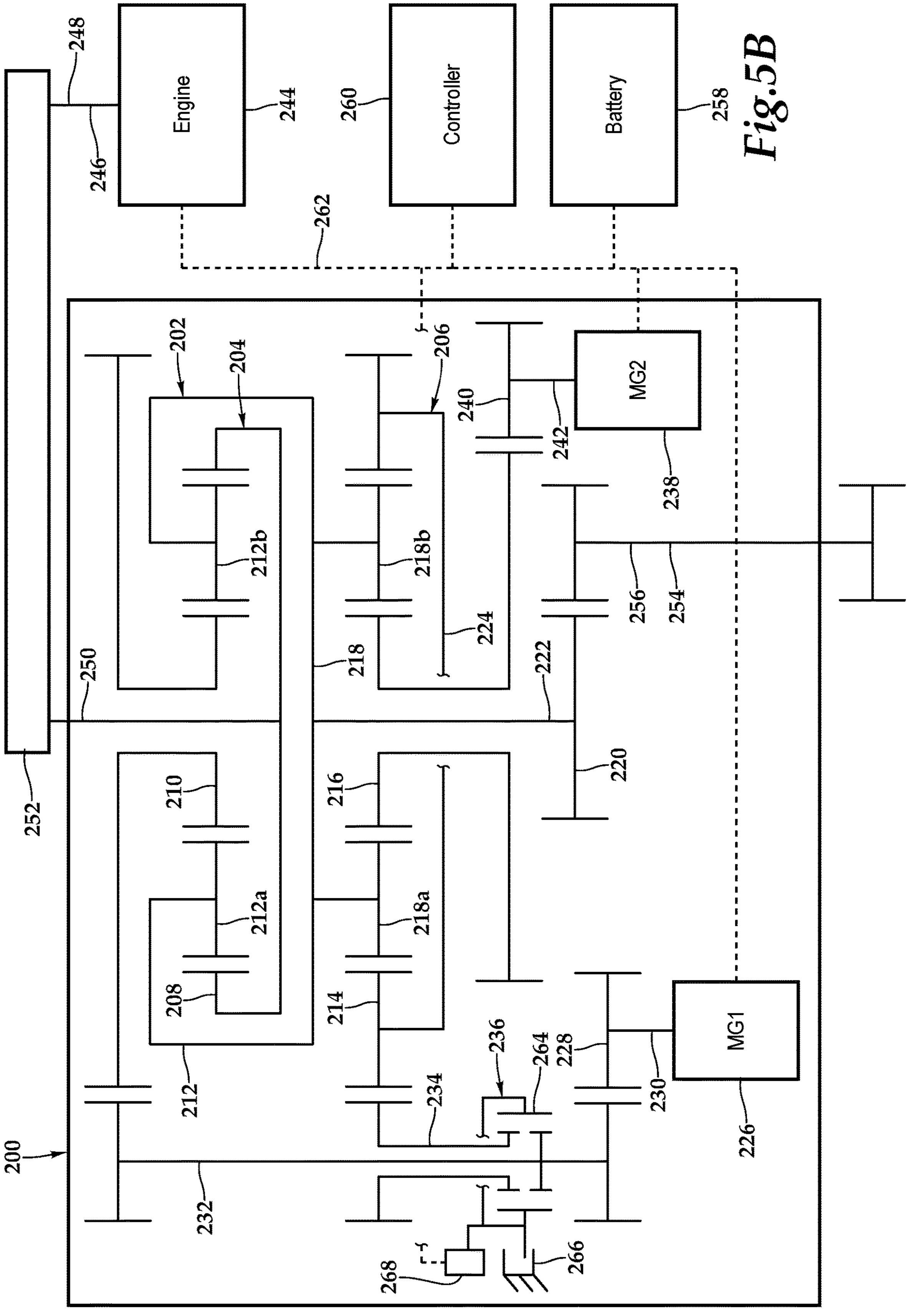
Figure 5C:
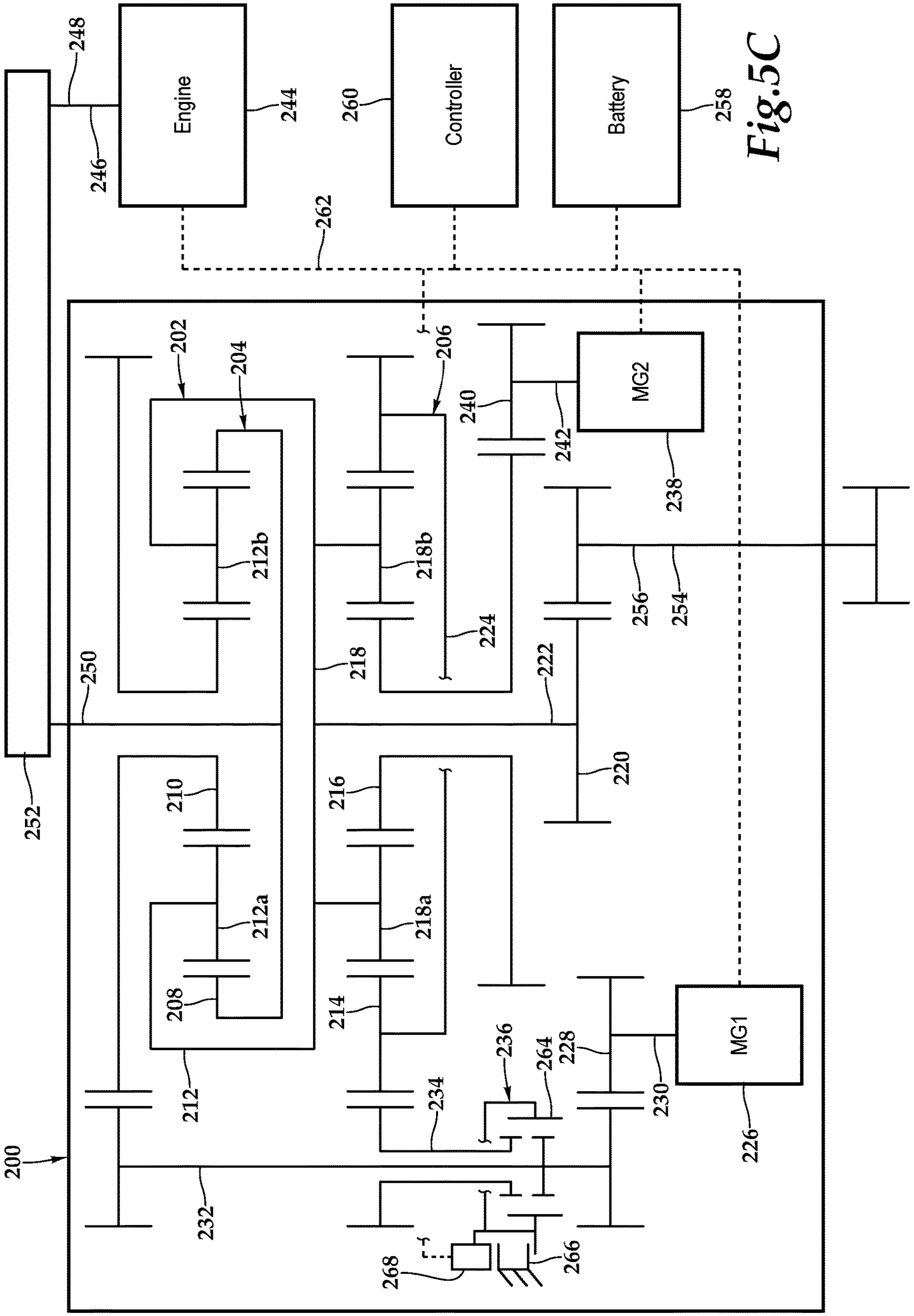

Referring next to FIGS. 5A-5C in the drawings, additional details regarding an electrically variable transmission 200, which is representative of electrically variable transmissions 36, 130, will now be discussed. Electrically variable transmission 200 is presented in a symbolic representation to aid in the clarity of the description. Electrically variable transmission 200 includes a compound planetary gear assembly 202 formed from a first planetary gear set 204 and a second planetary gear set 206. First planetary gear set 204 include a first ring gear 208, a first sun gear 210 and a first planet carrier 212 that includes a plurality of first planet gears, such as first planet gears 212*a*, 212*b*. Second planetary gear set 206 include a second ring gear 214, a second sun gear 216 and a second planet carrier 218 that includes a plurality of second planet gears, such as second planet gears 218*a*, 218*b*. In compound planetary gear assembly 202, first planet carrier 212 and second planet carrier 218 are coupled together for common rotation and are coupled to an output gear 220. Each of first ring gear 208, first sun gear 210, first planet carrier 212, second ring gear 214, second sun gear 216, second planet carrier 218 and output gear 220 share a common rotational axis indicated at 222, which is considered to be the rotational axis of compound planetary gear assembly 202. For convenience of illustration, second ring gear 214 is shown with a broken line 224 to prevent the overlapping of lines in the figure, however, those having ordinary skill in the art will understand the symbolic representation of second ring gear 214.

Electrically variable transmission 200 includes a first motor generator 226 that is operable to rotate an input gear 228 about a rotational axis 230 thereof. Input gear 228 is in torque transferring communication with first sun gear 210 of first planetary gear set 204 via a gear train including a gear system 232. As explained in greater detail herein, input gear 228 is in selective torque transferring communication with second ring gear 214 of second planetary gear set 206 via a gear train including gear system 232, a gear system 234 and a mode selector assembly 236. Electrically variable transmission 200 also includes a second motor generator 238 that is operable to rotate an input gear 240 about a rotational axis 242 thereof. Input gear 240 is in torque transferring communication with second sun gear 216 of second planetary gear set 206. In the illustrated embodiment, each of rotational axis 222 of compound planetary gear assembly 202, rotational axis 230 of first motor generator 226 and rotational axis 242 of second motor generator 238 is parallel to each of the other rotational axes of electrically variable transmission 200. More specifically, rotational axis 222 of compound planetary gear assembly 202 is parallel to each of rotational axis 230 of first motor generator 226 and rotational axis 242 of second motor generator 238. Rotational axis 230 of first motor generator 226 is parallel to each of rotational axis 222 of compound planetary gear assembly 202 and rotational axis 242 of second motor generator 238. Rotational axis 242 of second motor generator 238 is parallel to each of rotational axis 222 of compound planetary gear assembly 202 and rotational axis 230 of first motor generator 226.

By parallelly offsetting rotational axes 222, 230, 242 instead of having compound planetary gear assembly 202, first motor generator 226 and second motor generator 238 share a common rotational axis as in conventional electrically variable transmissions, the footprint of electrically variable transmission 200 may be greatly reduced such that electrically variable transmission 200 can be assembled in a sufficiently compact package to fit within the tight space requirements of an off-road vehicle. In addition, it should be understood by those having ordinary skill in the art that even though the symbolic representation of electrically variable transmission 200 depicts rotational axes 222, 230, 242 in a single plane, the symbolic representation is a two-dimensional representation of a three-dimensional system in which rotational axes 222, 230, 242 reside in three-dimensional space. As such, a proper interpretation of the term "parallel rotational axes" refers to non-intersecting and non-coincident rotational axes with no requirement for the recited rotational axes to be coplanar.

The primary input to electrically variable transmission 200 is provided by engine 244, which is representative of engines 34, 130. In the illustrated embodiment, engine 244 includes a crankshaft 246 that is operable to rotate about a rotational axis 248. Engine 244 is in torque transferring communication with first ring gear 208 of first planetary gear set 204 via an input shaft 250 and a belt or chain drive mechanism 252. In the illustrated arrangement, rotational axis 248 of crankshaft 246 is parallel to each of rotational axis 222 of compound planetary gear assembly 202, rotational axis 230 of first motor generator 226 and rotational axis 242 of second motor generator 238. The primary output from electrically variable transmission 200 is to the final drive of the off-road vehicle such as the rear axis of a wheeled off-road vehicle or the track driveshaft of a tracked off-road vehicle. In the illustrated embodiment, output gear 220 of compound planetary gear assembly 202 is in torque transferring communication with the final drive via a gear train including an output driveshaft 254 that is operable to rotate about a rotational axis 256. In the illustrated arrangement, rotational axis 256 of output driveshaft 254 is parallel to each of rotational axis 248 of crankshaft 246, rotational axis 222 of compound planetary gear assembly 202, rotational axis 230 of first motor generator 226 and rotational axis 242 of second motor generator 238.

The operation of electrically variable transmission 200 will now be described. FIG. 5A depicts electrically variable transmission 200 in a configuration particularly useful while operating in a low speed mode of the vehicle. As used herein, the term low speed refers to a vehicle speed ranging, for example, between zero percent and forty percent of the maximum vehicle speed. A battery 258 provides electrical power to first motor generator 226, second motor generator 238, engine 244, mode selector assembly 236, controller 260 and other electrical components of the off-road vehicle. Controller 260 provides commands for controlling the operations of first motor generator 226, second motor generator 238, engine 244, mode selector assembly 236, battery 258 and other components of the off-road vehicle responsive to operator inputs and control logic stored therein. Power and data communications between battery 258, controller 260, first motor generator 226, second motor generator 238, engine 244, mode selector assembly 236 and other electrical components of the off-road vehicle is enabled by a wired communication system depicted as dashed lines 262 including a broken section of dashed line extending to mode selector assembly 236. Even though a single battery 258 has been depicted and described, it should be understood by those having ordinary skill in the art that battery 258 represents any number of batteries which may be arranged in a single array or may be distributed in multiple locations including multiple batteries that may operate at different voltages. For example, one battery may be operably associated with engine 244, while another battery may be operably associated with first motor generator 226 and/or second motor generator 238.

Prior to starting the vehicle, electrically variable transmission 200 is configured in the low speed mode with first motor generator 226 in torque transferring communication with first sun gear 210 of first planetary gear set 204 and disengaged from torque transferring communication with second ring gear 214 of second planetary gear set 206. Specifically, mode selector assembly 236 is positioned such that the inner splines of selector sleeve 264 are out of mesh with the outer splines of gear system 232 and in mesh with the outer splines of gear system 234. Rotation of selector sleeve 264 is prevented by engagement with lock 266 which in turn prevents rotation of gear system 234 and thus second ring gear 214. As gear system 232 is disengaged from selector sleeve 264, first motor generator 226 is operable to rotate first sun gear 210 via gear system 232. Engine 244 may be started responsive to power from battery 258. Alternatively, responsive to power from battery 258 and commands from controller 260, first motor generator 226 may be used to cause first sun gear 210 to rotate which causes first ring gear 208 to rotate with first planet carrier 212 being held stationary. The rotation of first ring gear 208 is coupled to engine 244 via input shaft 250, drive mechanism 252 and crankshaft 246 such that engine 244 may be started. In an idle mode of engine 244, first motor generator 226 and/or second motor generator 238 may be used prevent rotation of output gear 220 by providing a torque balance with engine 244. Alternatively or additionally, a brake may be used to prevent rotation of the final drive, such that input from engine 244 into electrically variable transmission 200 is output by first motor generator 226 and/or second motor generator 238 acting in generator mode to, for example, charge battery 258.

During operation of the vehicle in the low speed mode, engine 244 may be operated within a desired speed range (desired revolutions per minute) with first motor generator 226 and second motor generator 238 being used to vary the ratio between the engine input speed and the transmission output speed. Specifically, by changing the input from first motor generator 226 to first sun gear 210 and by changing the input from second motor generator 238 to second sun gear 216, the gear ratio of electrically variable transmission 200 may be adjusted. In this manner, the output torque and the output speed at output gear 220 of compound planetary gear assembly 202 is controlled by varying the speed of engine 244, the speed of first motor generator 226, the speed of a second motor generator 238 or combinations thereof. It is noted that first motor generator 226 and second motor generator 238 may be operated in either rotational direction depending upon the desired gear ratio. As such, either or both of first motor generator 226 and second motor generator 238 may have a positive speed, a zero speed or a negative speed when providing input to electrically variable transmission 200. Engine 244 will generally only have a positive speed with backward rotation of crankshaft 246 prevented by a clutch or other suitable mechanism particularly when engine 244 is a four-stroke engine. It is noted that with a two-stroke engine, forward and backward rotation of the crankshaft may be allowed.

FIG. 5B depicts electrically variable transmission 200 in a configuration particularly useful while operating in an intermediate speed mode of the vehicle. As used herein, the term intermediate speed refers to a vehicle speed ranging, for example, between thirty percent and seventy percent of the maximum vehicle speed. When the vehicle approaches or has entered the intermediate speed range from below, controller 260 sends commands to actuator 268 of mode selector assembly 236 and to first motor generator 226. Specifically, rotation first motor generator 226 is stopped such that the relative rotation between the outer splines of gear system 232 and the outer splines of gear system 234 is stopped, noting that the outer splines of gear system 234 are stationary due to being coupled with locked selector sleeve 264. Once relative rotation has ceased, actuator 268 may shift selector sleeve 264 such that the inner splines of selector sleeve 264 are in mesh with the outer splines of gear system 232 and in mesh with the outer splines of gear system 234. Rotation of selector sleeve 264 is still prevented by engagement with lock 266 which now prevents rotation of gear system 232 and gear system 234 and thus of first sun gear 210 and second ring gear 214. First motor generator 226 is now disengage as an input to electrically variable transmission 200. In this configuration, engine 244 may be operated within a desired speed range with second motor generator 238 being used to vary the ratio between the engine input speed and the transmission output speed. Specifically, by changing the input from second motor generator 238 to second sun gear 216, the gear ratio of electrically variable transmission 200 may be adjusted. In this manner, the output torque and the output speed at output gear 220 of compound planetary gear assembly 202 is controlled by varying the speed of engine 244, the speed of second motor generator 238 or combinations thereof. In addition, engine 244 may function as the sole input to electrically variable transmission 200 in a direct drive mode or may be used to rotate second motor generator 238, which may function as an output from electrically variable transmission 200 in a generator mode to, for example, charge battery 258.

FIG. 5C depicts electrically variable transmission 200 in a configuration particularly useful while operating in a high speed mode of the vehicle. As used herein, the term high speed refers to a vehicle speed ranging, for example, between sixty percent and one hundred percent of the maximum vehicle speed. When the vehicle approaches or has entered the high speed range from below, controller 260 sends a command to actuator 268 of mode selector assembly 236 to shift selector sleeve 264 into disengagement with lock 266 while maintaining the inner splines of selector sleeve 264 in mesh with the outer splines of gear system 232 and in mesh with the outer splines of gear system 234. With gear system 232 and gear system 234 coupled together and free to rotate, operation of first motor generator 226 now causes rotation of first sun gear 210 and second ring gear 214. In this configuration, engine 244 may be operated within a desired speed range with first motor generator 226 and second motor generator 238 being used to vary the ratio between the engine input speed and the transmission output speed. Specifically, by changing the input from first motor generator 226 to first sun gear 210 and second ring gear 214 and/or by changing the input from second motor generator 238 to second sun gear 216, the gear ratio of electrically variable transmission 200 may be adjusted. In this manner, the output torque and the output speed at output gear 220 of compound planetary gear assembly 202 is controlled by varying the speed of engine 244, the speed of first motor generator 226, the speed of second motor generator 238 or combinations thereof. In addition, either first motor generator 226 or second motor generator 238 may be driven by engine 244 to function as an output from electrically variable transmission 200 in a generator mode to, for example, charge battery 258.

When it is desired to reduce vehicle speed and the vehicle approaches or has entered the intermediate speed range from above, controller 260 sends commands to actuator 268 of mode selector assembly 236 and to first motor generator 226. Specifically, rotation first motor generator 226 is stopped such that the relative rotation between selector sleeve 264 and lock 266 is stopped. Once relative rotation has ceased, actuator 268 may shift selector sleeve 264 into engagement with lock 266 while maintaining the inner splines of selector sleeve 264 in mesh with the outer splines of gear system 232 and in mesh with the outer splines of gear system 234. Rotation of selector sleeve 264 is now prevented by engagement with lock 266 which also prevents rotation of gear system 232 and gear system 234 and thus of first sun gear 210 and second ring gear 214. Electrically variable transmission 200 is now in the configuration depicted in and described with reference to FIG. 5B, which is particularly useful for operating in the intermediate speed mode of the vehicle.

When it is desired to further reduce vehicle speed and the vehicle approaches or has entered the low speed range from above, controller 260 sends a command to actuator 268 of mode selector assembly 236 to shift selector sleeve 264 such that the inner splines of selector sleeve 264 are out of mesh with the outer splines of gear system 232 and in mesh with the outer splines of gear system 234 while maintaining engagement with lock 266. As rotation of selector sleeve 264 remains prevented by engagement with lock 266, rotation of gear system 234 and thus of second ring gear 214 is prevented. Gear system 232 is now free to rotate such that second motor generator 226 may function as an input to rotate first sun gear 210. Electrically variable transmission 200 is now in the configuration depicted in and described with reference to FIG. 5A, which is particularly useful for operating in the low speed mode of the vehicle.

In this manner, electrically variable transmission 200 is operable to adjust the gear ratio between input shaft 250 and output gear 220 of compound planetary gear assembly 202 to provide not only variable speed control but also smooth power delivery for an off-road vehicle without the limitations associated with belt-driven continuously variable transmissions. In addition, electrically variable transmission 200 may be selectively configured for optimal performance in each of a low speed mode, an intermediate speed mode and a high speed mode of the vehicle. Importantly, by structurally offsetting the components of electrically variable transmission 200 such that each of rotational axis 248 of crankshaft 246, rotational axis 222 of compound planetary gear assembly 202, rotational axis 230 of first motor generator 226, rotational axis 242 of second motor generator 238 and rotational axis 256 of output driveshaft 254 is parallel to each other, electrically variable transmission 200 can be assembled in a sufficiently compact package to fit within the tight space requirements of an off-road vehicle.

Figure 6:
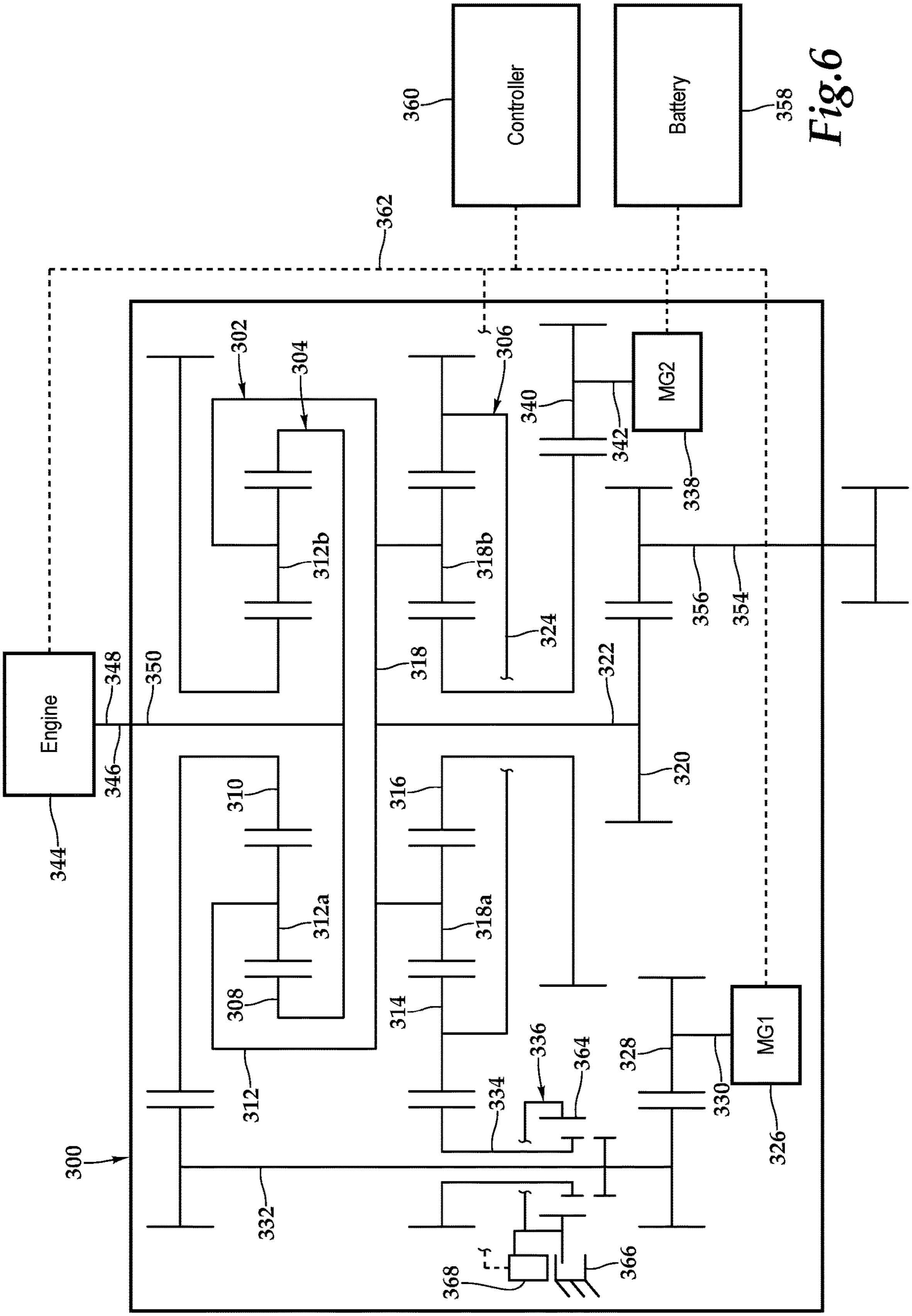
FIG. 6 is a schematic illustration of a powertrain for an off-road vehicle having an electrically variable transmission in accordance with embodiments of the present disclosure.

Referring next to FIG. 6 in the drawings, an alternate powertrain including an electrically variable transmission 300, which is representative of electrically variable transmissions 36, 130, will now be discussed. Electrically variable transmission 300 includes a compound planetary gear assembly 302 formed from a first planetary gear set 304 and a second planetary gear set 306. First planetary gear set 304 include a first ring gear 308, a first sun gear 310 and a first planet carrier 312 that includes a plurality of first planet gears, such as first planet gears 312*a*, 312*b*. Second planetary gear set 306 include a second ring gear 314, a second sun gear 316 and a second planet carrier 318 that includes a plurality of second planet gears, such as second planet gears 318*a*, 318*b*. In compound planetary gear assembly 302, first planet carrier 312 and second planet carrier 318 are coupled together for common rotation and are coupled to an output gear 320 for rotation therewith. Each of first ring gear 308, first sun gear 310, first planet carrier 312, second ring gear 314, second sun gear 316, second planet carrier 318 and output gear 320 share a common rotational axis indicated at 322, which is considered to be the rotational axis of compound planetary gear assembly 302.

Electrically variable transmission 300 includes a first motor generator 326 that is operable to rotate an input gear 328 about a rotational axis 330 thereof. Input gear 328 is in torque transferring communication with first sun gear 310 of first planetary gear set 304 via a gear train including a gear system 332. Input gear 328 is in selective torque transferring communication with second ring gear 314 of second planetary gear set 306 via a gear train including gear system 332, a gear system 334 and a mode selector assembly 336. Electrically variable transmission 300 also includes a second motor generator 338 that is operable to rotate an input gear 340 about a rotational axis 342 thereof. Input gear 340 is in torque transferring communication with second sun gear 316 of second planetary gear set 306. In the illustrated embodiment, each of rotational axis 322 of compound planetary gear assembly 302, rotational axis 330 of first motor generator 326 and rotational axis 342 of second motor generator 338 is parallel to each of the other rotational axes of electrically variable transmission 300.

The primary input to electrically variable transmission 300 is provided by engine 344, which is representative of engines 34, 130. In the illustrated embodiment, engine 344 includes a crankshaft 346 that is operable to rotate about a rotational axis 348. Engine 344 is in torque transferring communication with first ring gear 308 of first planetary gear set 304 via an input shaft 350. In the illustrated arrangement, rotational axis 348 of crankshaft 346 is common with rotational axis 322 of compound planetary gear assembly 302 and is parallel to each of rotational axis 330 of first motor generator 326 and rotational axis 342 of second motor generator 338. The primary output from electrically variable transmission 300 is to the final drive of the off-road vehicle. In the illustrated embodiment, output gear 320 of compound planetary gear assembly 302 is in torque transferring communication with the final drive via a gear train including an output driveshaft 354 that is operable to rotate about a rotational axis 356. In the illustrated arrangement, rotational axis 356 of output driveshaft 354 is parallel to each of rotational axis 348 of crankshaft 346, rotational axis 322 of compound planetary gear assembly 302, rotational axis 330 of first motor generator 326 and rotational axis 342 of second motor generator 338.

The operation of electrically variable transmission 300 is substantially similar to that of electrically variable transmission 200 including having a low speed configuration in which the inner splines of locked selector sleeve 364 are out of mesh with the outer splines of gear system 332 and in mesh with the outer splines of gear system 334, an intermediate speed configuration in which the inner splines of locked selector sleeve 364 are in mesh with the outer splines of gear system 332 and in mesh with the outer splines of gear system 334, and a high speed configuration in which the inner splines of unlocked selector sleeve 364 are in mesh with the outer splines of gear system 332 and in mesh with the outer splines of gear system 334. In addition, electrically variable transmission 300 is shifted between the speed configurations responsive to commands from controller 360 sent over a wire communication system 362 that distributes power and signal communications between battery 358, controller 360, engine 344, first motor generator 326, second motor generator 338, mode selector assembly 336 and to other electrical components of the vehicle. The commands enable actuator 368 to shift selector sleeve 364 in and out of engagement with gear system 332 as well as in and out of engagement with lock 366.

In this manner, electrically variable transmission 300 is operable to adjust the gear ratio between input shaft 350 and output gear 320 of compound planetary gear assembly 302 to provide not only variable speed control but also smooth power delivery for an off-road vehicle without the limitations associated with belt-driven continuously variable transmissions. In addition, electrically variable transmission 300 may be selectively configured for optimal performance in each of a low speed mode, an intermediate speed mode and a high speed mode of the vehicle. Importantly, by structurally offsetting the components of electrically variable transmission 300 such that each of rotational axis 322 of compound planetary gear assembly 302, rotational axis 330 of first motor generator 326, rotational axis 342 of second motor generator 338 and rotational axis 356 of output driveshaft 354 is parallel to each other, electrically variable transmission 300 can be assembled in a sufficiently compact package to fit within the tight space requirements of an off-road vehicle.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An electrically variable transmission for an off-road vehicle having an internal combustion engine with a crankshaft, the transmission comprising:

a compound planetary gear assembly having first and second planetary gear sets, the first planetary gear set including a first ring gear, a first sun gear and a first planet carrier, the second planetary gear set including a second ring gear, a second sun gear and a second planet carrier, the first and second planet carriers coupled together for common rotation, the first ring gear in torque transferring communication with the crankshaft, the compound planetary gear assembly having a first rotational axis;

a first motor generator having a first input gear in torque transferring communication with the first sun gear, the first input gear having a second rotational axis;

a second motor generator having a second input gear in torque transferring communication with the second sun gear, the second input gear having a third rotational axis;

an output gear coupled to the first and second planet carriers for common rotation therewith; and a mode selector assembly comprising a selector sleeve with internal splines and first and second coupling gears respectively fixed to the first input gear and to the second ring gear, the selector sleeve being axially shiftable between a first position, in which the internal splines mesh only with the second coupling gear to thereby hold the second ring gear against rotation and leave the first input gear driving only the first sun gear, and a second position, in which the internal splines simultaneously mesh with both the first and second coupling gears to thereby mechanically couple the first input gear to the second ring gear;

wherein, the first, second and third rotational axes are non-intersecting, non-coincident, parallel rotational axes that do not lie in a common plane.

2. The transmission as recited in claim 1 wherein, the crankshaft has a fourth rotational axis; and wherein, the first, second, third and fourth rotational axes are parallel rotational axes, wherein the parallel rotational axes are non-intersecting, non-coincident, and non-coplanar.

3. The transmission as recited in claim 2 further comprising an output driveshaft in torque transferring communication with the output gear, the output driveshaft having a fifth rotational axis; and wherein, the first, second, third, fourth and fifth rotational axes are parallel rotational axes.

4. The transmission as recited in claim 1 wherein, the crankshaft has a fourth rotational axis; and wherein, the first and fourth rotational axes are common rotational axes.

5. The transmission as recited in claim 4 further comprising an output driveshaft in torque transferring communication with the output gear, the output driveshaft having a fifth rotational axis; and wherein, the first, second, third and fifth rotational axes are parallel rotational axes.

6. The transmission as recited in claim 1 further comprising an output driveshaft in torque transferring communication with the output gear, the output driveshaft having a fourth rotational axis; and wherein, the first, second, third and fourth rotational axes are parallel rotational axes.

7. The transmission as recited in claim 1 wherein, in a low speed mode of the vehicle, the second ring gear is stationary and each of the engine, the first motor generator and the second motor generator is configurable as an input to the compound planetary gear assembly.

8. The transmission as recited in claim 7 wherein, an output torque and an output speed of the compound planetary gear assembly is controlled by varying at least one of an engine speed, a first motor generator speed and a second motor generator speed.

9. The transmission as recited in claim 1 wherein, in an intermediate speed mode of the vehicle, the first sun gear, the second ring gear and the first motor generator are stationary and each of the engine and the second motor generator is configurable as an input to the compound planetary gear assembly.

10. The transmission as recited in claim 9 wherein, an output torque and an output speed of the compound planetary gear assembly is controlled by varying at least one of an engine speed and a second motor generator speed.

11. The transmission as recited in claim 9 wherein, the second motor generator is configurable as an output of the compound planetary gear assembly operable to charge a battery.

12. The transmission as recited in claim 1 wherein, in a high speed mode of the vehicle, the first input gear of the first motor generator is in torque transferring communication with the first sun gear and the second ring gear and each of the engine, the first motor generator and the second motor generator is configurable as an input to the compound planetary gear assembly.

13. The transmission as recited in claim 12 wherein, an output torque and an output speed of the compound planetary gear assembly is controlled by varying at least one of an engine speed, a first motor generator speed and a second motor generator speed.

14. The transmission as recited in claim 12 wherein, each the first motor generator and the second motor generator is configurable as an output of the compound planetary gear assembly operable to charge a battery.

15. An off-road vehicle comprising:

an internal combustion engine with a crankshaft;

a compound planetary gear assembly having first and second planetary gear sets, the first planetary gear set including a first ring gear, a first sun gear and a first planet carrier, the second planetary gear set including a second ring gear, a second sun gear and a second planet carrier, the first and second planet carriers coupled together for common rotation, the first ring gear in torque transferring communication with the crankshaft, the compound planetary gear assembly having a first rotational axis;

a first motor generator having a first input gear in torque transferring communication with the first sun gear, the first input gear having a second rotational axis;

a second motor generator having a second input gear in torque transferring communication with the second sun gear, the second input gear having a third rotational axis;

an output gear coupled to the first and second planet carriers for common rotation therewith;

a mode selector assembly comprising a selector sleeve with internal splines and first and second coupling gears respectively fixed to the first input gear and to the second ring gear, the selector sleeve being axially shiftable between a first position, in which the internal splines mesh only with the second coupling gear to hold the second ring gear against rotation and thereby leave the first input gear driving only the first sun gear, and a second position, in which the internal splines simultaneously mesh with both the first and second coupling gears to mechanically couple the first input gear to the second ring gear; and at least one ground-engaging member in torque transferring communication with the output gear, the at least one ground-engaging member configured to provide ground propulsion for the vehicle responsive to torque from the output gear;

wherein, the first, second and third rotational axes are non-intersecting, non-coincident, parallel rotational axes that do not lie in a common plane.

16. The off-road vehicle as recited in claim 15 wherein, the off-road vehicle is a wheeled off-road vehicle.

17. The off-road vehicle as recited in claim 15 wherein, the off-road vehicle is a tracked off-road vehicle.

18. The off-road vehicle as recited in claim 15 wherein, the compound planetary gear assembly is positioned aft of the internal combustion engine.

19. The off-road vehicle as recited in claim 15 wherein, the compound planetary gear assembly is positioned forward of the internal combustion engine.

20. The off-road vehicle as recited in claim 15 wherein, the compound planetary gear assembly is positioned lateral of the internal combustion engine.

* * * * *